United States Patent
Okamoto et al.

(10) Patent No.: US 9,404,779 B2
(45) Date of Patent: Aug. 2, 2016

(54) POSITION DETECTING DEVICE

(71) Applicant: SMC KABUSHIKI KAISHA, Chiyoda-ku (JP)

(72) Inventors: Atsushi Okamoto, Moriya (JP); Takaya Toyoda, Yashio (JP)

(73) Assignee: SMC KABUSHIKI KAISHA, Chiyoda-ku (JP)

(*) Notice: Subject to any disclaimer, the term of this patent is extended or adjusted under 35 U.S.C. 154(b) by 351 days.

(21) Appl. No.: 13/969,827

(22) Filed: Aug. 19, 2013

(65) Prior Publication Data

US 2014/0083203 A1  Mar. 27, 2014

(30) Foreign Application Priority Data

Sep. 21, 2012 (JP) ................................ 2012-207801

(51) Int. Cl.
*G01F 1/42* (2006.01)

(52) U.S. Cl.
CPC ........................................ *G01F 1/42* (2013.01)

(58) Field of Classification Search
CPC ....................................................... G01B 13/12
USPC ........................... 73/37, 37.5, 861.61–861.64
See application file for complete search history.

(56) References Cited

U.S. PATENT DOCUMENTS

| | | | | |
|---|---|---|---|---|
| 5,540,082 A * | 7/1996 | Okuyama | ............ | B23Q 17/006 73/37.5 |
| 6,674,029 B2 * | 1/2004 | Okuyama | ........... | G01L 19/0015 200/187 |
| 7,117,719 B2 * | 10/2006 | Sawafuji | ................ | G01B 13/16 73/37.5 |
| 2002/0178838 A1 * | 12/2002 | Sato | ..................... | B23Q 17/002 73/861.63 |
| 2010/0005957 A1 * | 1/2010 | Ikari | ................... | F15B 15/1428 92/161 |
| 2010/0044942 A1 * | 2/2010 | Tamai | .................... | B25B 5/122 269/32 |
| 2014/0232051 A1 * | 8/2014 | Higurashi | ............. | G01B 7/003 269/20 |

FOREIGN PATENT DOCUMENTS

| | | |
|---|---|---|
| JP | 6-114685 | 4/1994 |
| JP | 10-332356 | 12/1998 |
| JP | 2000-141166 | 5/2000 |
| JP | 2008-23702 A | 2/2008 |

OTHER PUBLICATIONS

Office Action issued Sep. 30, 2014 in Japanese Patent Application No. 2012-207801 (with partial English language translation).

* cited by examiner

*Primary Examiner* — Hezron E Williams
*Assistant Examiner* — Hoang Nguyen
(74) *Attorney, Agent, or Firm* — Oblon, McClelland, Maier & Neustadt, L.L.P

(57) ABSTRACT

A position detecting device is equipped with a device main body into which a pressure fluid supplied from a pressure fluid supply source is introduced, and an attaching/detaching mechanism that enables attachment and detachment with respect to the device main body. The attaching/detaching mechanism includes an internal nozzle that delivers, toward the side of a detection nozzle, the pressure fluid supplied to the device main body, and a detection port that supplies, to the detection nozzle, the pressure fluid delivered from the internal nozzle.

14 Claims, 12 Drawing Sheets

POSITION DETECTING DEVICE

CROSS-REFERENCE TO RELATED APPLICATION

This application is based upon and claims the benefit of priority from Japanese Patent Application No. 2012-207801 filed on Sep. 21, 2012, the contents of which are incorporated herein by reference.

BACKGROUND OF THE INVENTION

1. Field of the Invention

The present invention relates to a position detecting device, which ejects a pressure fluid supplied from a pressure fluid supply source from a detection nozzle with respect to a detection surface of a workpiece, and detects a back pressure from the detection surface to thereby detect the position of the workpiece.

2. Description of the Related Art

Heretofore, when carrying out processing on a workpiece by a machine tool or the like, it has widely been practiced to use a back pressure type of position detecting device in order to confirm the position of the workpiece (see, for example, Japanese Laid-Open Patent Publication No. 06-114685, Japanese Laid-Open Patent Publication No. 10-332356, and Japanese Laid-Open Patent Publication No. 2000-141166).

FIG. 11 is an explanatory drawing showing in outline a conventional back pressure type of position detecting device 150.

In this case, a pressure fluid supply source 152 is connected via a passage 154 to a supply port 156 of the position detecting device 150. Further, a detection port 158 of the position detecting device 150 is connected via a passage 160 to a detection nozzle 164 provided in a table 162. Furthermore, a workpiece 166 is arranged in confronting relation to a reference surface 165 of the table 162. Further, a surface (detection surface) 168 of the workpiece 166, which confronts the reference surface 165 of the table 162, is separated from the reference surface 165 by a distance X.

In this situation, when the pressure fluid is supplied from the pressure fluid supply source 152 via the passage 154 to the supply port 156, the pressure fluid, which is introduced into the position detecting device 150, is constricted or throttled by an internal nozzle 170 and is delivered to the detection port 158. The delivered pressure fluid is supplied to the detection nozzle 164 from the detection port 158 via the passage 160, and the pressure fluid is ejected toward the detection surface 168 of the workpiece 166 from the detection nozzle 164.

A pressure sensor 172 is connected to a detection port 158 side of the internal nozzle 170. The pressure sensor 172 detects a pressure (back pressure) of the pressure fluid during the time that the pressure fluid is ejected toward the detection surface 168 from the detection nozzle 164.

FIG. 12 is a graph illustrating a relationship between the distance X and the back pressure P2 for each of different pressures (supply pressures) P1 at which the pressure fluid is supplied to the supply port 156. As shown in FIG. 12, the supply pressure P1 ranges from Pa to Pc, in which the relationship Pa>Pb>Pc is satisfied. In this case, the position detecting device 150, under a condition in which the workpiece 166 is arranged at a predetermined distance X0, detects the back pressure P2 at a time that the pressure fluid having a supply pressure P1 (initial set pressure) is supplied to the supply port 156 from the pressure fluid supply source 152, and the detected back pressure P2 is set at a threshold value of P0. Moreover, in FIG. 12, the back pressure, which corresponds to the distance X0 in the graph where P1=Pb, is set at the threshold value P0. Further, the distance X0 is defined as a maximum distance at which it can be regarded that the workpiece 166 is seated with respect to the table 162.

Next, in the position detecting device 150, when the back pressure P2 is detected by the pressure sensor 172 at the time that the pressure fluid is ejected toward the detection surface 168 of the workpiece 166, which is arranged at an arbitrary distance X from the detection nozzle 164, in the event that the inequality P2>P0 is satisfied, it is judged that the detection surface 168 of the workpiece 166 has become seated on the reference surface 165, and such a judgment result is output as an ON signal.

Moreover, since the relationship shown in FIG. 12 exists between the back pressure P2 and the distance X, the position detecting device 150 may determine the distance X corresponding to the back pressure P2, and seating of the workpiece 166 may be judged by comparing the determined distance X with the distance X0.

SUMMARY OF THE INVENTION

With the above-described position detecting device 150, apart from position confirmation (seating confirmation) of the workpiece 166, the position detecting device 150 can be used to confirm working dimensions of the workpiece 166, whether a detection object including the workpiece 166 is present or not, and to confirm a clamped condition of the workpiece 166. Accordingly, the position detecting device 150 is used in various environments in which cutting oil used for processing of the workpiece 166 with a machine tool or cutting chips generated by processing the workpiece 166 are scattered in the vicinity of the position detecting device 150.

Thus, foreign matter (drain) such as oils and metallic particles (e.g., iron powder) contained in the pressure fluid become mixed within the position detecting device 150 from the side of the supply port 156, or foreign matter such as cutting oil or chips becomes mixed within the position detecting device 150 from the detection nozzle 164 via the passage 160 and the detection port 158, which can lead to clogging of the internal nozzle 170. In this case, although such foreign matter can be eliminated by dismantling the position detecting device 150 and removing the internal nozzle 170 and cleaning the removed internal nozzle 170, it is not easy to remove clogged foreign matter in the internal nozzle 170.

Further, for avoiding a reverse flow of pressure fluid from the detection nozzle 164 into the position detecting device 150, the position detecting device 150 is attached to an upper portion of the machine tool with the detection port 158 thereof being oriented downward. However, because the upper portion of the machine tool is in a location that cannot be easily reached by the hands of an operator, it is complicated to remove the position detecting device 150 from the machine tool.

For these reasons, it is not easy for maintenance to be performed on the conventional position detecting device 150. In particular, in a condition in which plural position detecting devices 150 are connected laterally in the form of a manifold, removal of position detecting devices 150 for which maintenance is required from the machine tool is all the more complex, and ease of maintenance is adversely affected to a considerable extent.

Furthermore, in the event that foreign matter becomes clogged in the internal nozzle 170 or the detection nozzle 164, or if there are fluctuations in the supply pressure P1, the pressure sensor 172 cannot accurately detect the back pressure P2.

For example, in the case that the supply pressure P1 changes from Pb to either Pa or Pc, the distance X0 responsive to the threshold value P0 also changes. As a result, by comparing the back pressure P2 detected by the pressure sensor 172 with the threshold value P0 after having changed, the position detecting device 150 may mistakenly detect that the seating position (distance X) of the workpiece 166 is improper (i.e., that the workpiece 166 is defective) even though the seating position actually is appropriate, or even if the workpiece 166 is defective, the position detecting device 150 may possibly detect in error that the workpiece 166 is non-defective (i.e., that the distance X is appropriate).

Further, in the case that foreign matter becomes clogged in the internal nozzle 170 or the detection nozzle 164, the back pressure P2 is changed due to such clogging of foreign matter. In this case as well, by comparing the changed back pressure P2 with the threshold value P0 after having changed, the position detecting device 150 may mistakenly detect that the workpiece 166 is defective even if the workpiece 166 is non-defective, or may mistakenly detect that the workpiece 166 is non-defective even if the workpiece 166 actually is defective.

In this manner, in the case of a change in the supply pressure P1, or clogging of foreign matter in the internal nozzle 170 or the detection nozzle 164, since there is a risk that the aforementioned detection errors could occur, defective workpieces 166 are shipped, or alternatively, so-called short-period-stoppages (stopping of equipment due to temporary troubles) tend to occur, which leads to a decrease in the capacity utilization rate of the machine tool.

Further, as noted above, the cause of mistaken detection of the distance X is due to variations in the supply pressure P1, or due to clogging of foreign matter in the detection nozzle 164 or the internal nozzle 170. However, the position detecting device 150 is not capable of identifying if such mistaken detection is generated by problems with the workpiece 166 per se, or if such mistaken detection occurs due to clogging of foreign matter in the interior of the position detecting device 150.

The present invention has been made to resolve the aforementioned problems, and has an object of providing a position detecting device, in which ease of maintenance thereon can be enhanced, together with preventing mistaken detection of workpiece position.

The position detecting device according to the present invention comprises a device main body into which pressure fluid supplied from a pressure fluid supply source is introduced, and an attaching/detaching mechanism that enables attachment and detachment with respect to the device main body. In this case, the attaching/detaching mechanism includes an internal nozzle that delivers, toward the side of the detection nozzle, the pressure fluid supplied to the device main body, and a detection port that supplies, to the detection nozzle, the pressure fluid delivered from the internal nozzle.

As described above, with the present invention, the attaching/detaching mechanism including the internal nozzle and the detection port is capable of being attached to and detached from the device main body. Consequently, in the event that foreign matter becomes clogged in the internal nozzle, the attaching/detaching mechanism can be removed from the device main body, and such foreign matter can be eliminated by cleaning the internal nozzle. Stated otherwise, with the present invention, the internal nozzle can be removed and clogged foreign matter in the internal nozzle can be eliminated without requiring dismantling of the entire position detecting device.

Further, in a condition in which the attaching/detaching mechanism including the detection port is oriented downward, in the case that the position detecting device is to be removed from an upper portion of the machine tool, an operator may remove only the attaching/detaching mechanism from the device main body. Consequently, compared with the conventional technique, access to the internal nozzle is easily facilitated, and the internal nozzle can easily be removed from the position detecting device.

In particular, in a condition in which plural position detecting devices are connected laterally in the form of a manifold, and if the respective position detecting devices in the form of a manifold are to be removed from an upper portion of a machine tool, it is sufficient to remove, from the device main body, attaching/detaching mechanisms of only those position detecting devices having internal nozzles that need to be removed. Consequently, ease of maintenance with respect to the position detecting devices arranged in the form of a manifold can be improved significantly.

In the foregoing manner, with the present invention, by enabling attachment and detachment of the attaching/detaching mechanism with respect to the device main body, ease of maintenance of the position detecting device can be enhanced. Further, by facilitating maintenance thereon, since the operation to remove clogged foreign matter in the internal nozzle can easily be performed, mistaken detection of the workpiece position can be prevented.

In addition, the position detecting device according to the present invention preferably has the structures indicated in the following items [1] through [10].

[1] A supply passage into which the pressure fluid supplied from the pressure fluid supply source is introduced, and a mounting section, which communicates with the supply passage and on which the attaching/detaching mechanism is mounted, may be provided in the device main body, an orifice, which communicates with the supply passage when the attaching/detaching mechanism is mounted on the mounting section, may be provided in the internal nozzle, and a detection passage, which communicates with the orifice, and which supplies, to the detection nozzle, the pressure fluid delivered from the supply passage via the orifice, may be provided in the detection port.

With the foregoing structure, since the attaching/detaching mechanism can easily be attached and detached with respect to the device main body, ease of maintenance can be further enhanced. Further, merely by mounting the attaching/detaching mechanism on the mounting section, the supply passage, the orifice, and the detection passage can be placed in a state of communication, and therefore, the operation to install the attaching/detaching mechanism is more easily performed.

[2] The attaching/detaching mechanism may be tubular-shaped, one end thereof extending along a central axis of the attaching/detaching mechanism constituting the internal nozzle, and another end thereof extending along the central axis constituting the detection port. With respect thereto, the mounting section may be formed as a recess in which the tubular-shaped attaching/detaching mechanism is capable of being mounted.

In this case, a portion of the detection port on the side of the internal nozzle is formed as a reduced diameter section having an outer diameter smaller than an inner diameter of the recess, and a communication hole that communicates with the detection passage is formed in the reduced diameter section along a radial direction of the attaching/detaching mechanism. Consequently, if the attaching/detaching mechanism is mounted on the mounting section, a location in the vicinity of the reduced diameter section in the mounting section forms a fluid introduction space, which communicates with the detection passage via the communication hole.

In addition, with the position detecting device, a detection passage side pressure sensor may be used for detecting the back pressure, by detecting a pressure of the pressure fluid introduced from the detection passage into the fluid introduction space via the communication hole.

The pressure fluid supplied to the supply passage is throttled by the orifice and is directed into the detection passage. In this case, as shown in FIG. 6, in the vicinity of the orifice of the detection passage, the pressure fluid is discharged from the orifice as a constricted flow. Owing thereto, a pressure drop of the pressure fluid is comparatively large in the vicinity of the orifice, and as a result, due to the occurrence of boundary separation, stagnation occurs on both side portions of the constricted flow. Accordingly, it is easy for foreign matter to collect at such locations where stagnation occurs. Further, the pressure of the pressure fluid delivered to the detection port gradually is restored accompanying movement of the pressure fluid toward the side (downstream side) of the detection port.

Thus, according to the present invention, the pressure fluid is introduced into the fluid introduction space from the detection passage via the communication hole, and the back pressure is detected by detecting the pressure of the introduced pressure fluid using the detection passage side pressure sensor. Accordingly, the back pressure can reliably be detected with good precision, without being influenced by foreign matter collected in areas where the fluid is stagnant.

[3] In the case of the aforementioned item [2], the communication hole may be formed as a plurality of individual communication holes in the reduced diameter section. In accordance with such a structure, flows of the pressure fluid are generated between the detection passage and the fluid introduction space. Owing thereto, even if foreign matter becomes mixed with the fluid in the fluid introduction space from the detection passage via one of the communication holes, such foreign matter can be discharged into the detection passage via the other communication holes. As a result, collection of foreign matter in the fluid introduction space can be prevented, and any influence of such foreign matter on the back pressure detected by the detection passage side pressure sensor can reliably be eliminated.

The communication holes preferably are disposed at an upstream side location close to the orifice in the reduced diameter section, and at a location further downstream from the aforementioned upstream side location. If disposed in this way, as shown in FIG. 6, the pressure fluid is introduced into the fluid introduction space via the downstream side communication holes, and is discharged into the detection passage via the upstream side communication holes. In this case, if the pressure (back pressure) of the pressure fluid is detected by the detection passage side pressure sensor in the vicinity of the upstream side communication holes in the fluid introduction space, flows of the pressure fluid do not confront the pressure sensor. Consequently, direct impingement of foreign matter on the detection passage side pressure sensor can be avoided.

[4] A supply passage side pressure sensor may be provided for detecting a pressure (supply pressure) of the pressure fluid that is introduced into the supply passage. Accordingly, monitoring of the supply pressure (e.g., monitoring fluctuations in the supply pressure) is made possible.

[5] The detection passage side pressure sensor may comprise a gauge pressure sensor disposed in the device main body so as to face the fluid introduction space, and the supply passage side pressure sensor may comprise a gauge pressure sensor disposed in the device main body so as to face the supply passage. Consequently, without using a differential pressure sensor, which is comparatively high in cost, the differential pressure between an upstream side (the supply passage) and a downstream side (the detection passage) of the internal nozzle can be calculated.

[6] In place of the structure in item [5], a gauge pressure sensor may be provided on either one of an upstream side or a downstream side of the internal nozzle, and a differential pressure sensor may be disposed between the upstream side and the downstream side of the internal nozzle.

More specifically, a differential pressure sensor including functions of the supply passage side pressure sensor and the detection passage side pressure sensor may be provided for detecting a differential pressure between the supply pressure and the back pressure, and a gauge pressure sensor may be used that functions either as the supply passage side pressure sensor, which is disposed in the device main body so as to face the supply passage, or as the detection passage side pressure sensor, which is disposed in the device main body so as to face the fluid introduction space.

[7] The position detecting device may further comprise an abnormality detector for detecting an abnormality of the position detecting device, based on the supply pressure detected by the supply passage side pressure sensor and/or the back pressure detected by the detection passage side pressure sensor. Consequently, abnormalities of the position detecting device can be indicated as errors to the exterior (e.g., an operator).

The aforementioned abnormalities of the position detecting device may be any one of (1) pressure variations (fluctuations in supply pressure) of the pressure fluid supplied to the supply passage from the pressure fluid supply source, (2) clogging of foreign matter between the detection port and the detection nozzle, and (3) clogging of foreign matter in the internal nozzle.

More specifically, the abnormality detector can detect fluctuations in the supply pressure based on the supply pressure detected by the supply passage side pressure sensor, can detect clogging of foreign matter between the detection port and the detection nozzle based on the back pressure detected by the detection passage side pressure sensor, and/or can detect clogging of foreign matter in the internal nozzle based on a differential pressure between the supply pressure detected by the supply passage side pressure sensor and the back pressure detected by the detection passage side pressure sensor.

In the foregoing manner, with the present invention, occurrences of the aforementioned abnormalities (1) through (3) are monitored, and if such an abnormality occurs, since the abnormality is indicated to the exterior, the cause of the abnormality can be specified, while avoiding various types of mistaken detections by the position detecting device before they occur.

[8] The position detecting device may further include a storage unit for storing a predetermined threshold value. In this case, the abnormality detector detects an abnormality of the position detecting device, based on a comparison between the threshold value read out from the storage unit, and the supply pressure detected by the supply passage side pressure sensor and/or the back pressure detected by the detection passage side pressure sensor. Accordingly, such abnormalities in the position detecting device can be detected reliably and accurately.

[9] The abnormality detector may detect an abnormality of the position detecting device, based on information pertaining to conveyance of the workpiece supplied from a control device that controls conveyance of the workpiece, and the supply pressure detected by the supply passage side pressure sensor and/or the back pressure detected by the detection passage side pressure sensor. Accordingly, such abnormalities in the position detecting device can be detected reliably and accurately.

[10] The internal nozzle and the detection port may be constructed integrally as a monocoque structure, or may be separable when the attaching/detaching mechanism is removed from the device main body.

If the internal nozzle and the detection port are separable, an operation to eliminate foreign matter clogged in the internal nozzle can easily be performed, together with enabling the internal nozzle to easily be exchanged. On the other hand, if the internal nozzle and the detection port are configured with a monocoque structure, the mechanical strength of the attaching/detaching mechanism can be increased.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a position detecting device according to the present invention will be described in detail below with reference to the accompanying drawings.

[Outline Configuration of the Present Embodiment]

Figure 1:
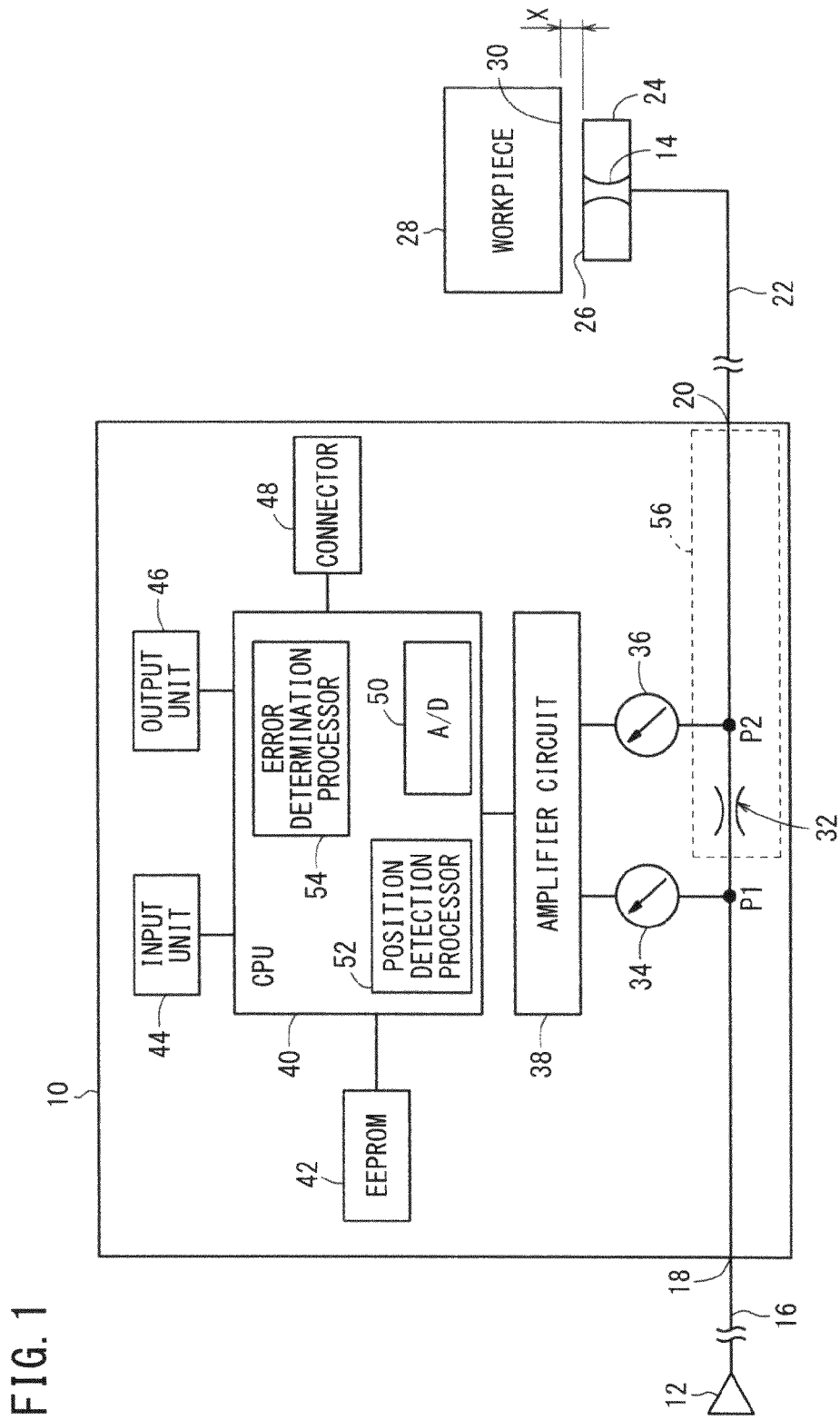
FIG. 1 is an outline explanatory drawing of a position detecting device according to the present embodiment.

FIG. 1 is an outline explanatory drawing of a position detecting device 10 according to the present embodiment. Prior to describing in detail the structure of the position detecting device 10, an outline structure in relation to detecting the position of a workpiece 28, including the position detecting device 10, a pressure fluid supply source 12, and a detection nozzle 14, will be explained with reference to FIG. 1.

The position detecting device 10 is used in order to confirm the position (confirmation of seating) of a workpiece 28 on which processing is carried out by a machine tool, in order to confirm processing dimensions of the workpiece 28, to confirm the presence or absence of a detection object including the workpiece 28, to confirm a clamped state of the workpiece 28, etc. In the following descriptions, unless specified otherwise, a case shall be described in which confirmation of seating of the workpiece 28 is carried out with respect to a table 24.

The position detecting device 10 is connected to the pressure fluid supply source 12 and the detection nozzle 14. More specifically, the pressure fluid supply source 12 is connected via a passage 16 to a supply port 18 on an input side of the position detecting device 10. Further, a detection port 20 on an output side of the position detecting device 10 is connected via a passage 22 to the detection nozzle 14, which is disposed in the table 24. A surface (detection surface) 30 of the workpiece 28 is separated by a distance X with respect to a reference surface 26 of the table 24.

An internal nozzle 32 is arranged in the position detecting device 10 between the supply port 18 and the detection port 20. A pressure sensor (supply passage side pressure sensor) 34 that serves as a gauge sensor is arranged on an upstream side of the internal nozzle 32, whereas another pressure sensor (detection passage side pressure sensor) 36 that serves as a gauge sensor is arranged on the downstream side of the internal nozzle 32.

Consequently, when pressure fluid is supplied from the pressure fluid supply source 12 to the supply port 18 via the passage 16, the supplied pressure fluid is throttled by the internal nozzle 32, and then is delivered from the detection port 20 to the detection nozzle 14 via the passage 22. The detection nozzle 14 ejects the pressure fluid delivered thereto toward the detection surface 30 of the workpiece 28. In this case, the pressure sensor 34 sequentially detects the pressure (supply pressure) P1 of the pressure fluid that is supplied to the internal nozzle 32. The pressure sensor 36 sequentially detects the pressure of the pressure fluid that is delivered to the detection port 20 from the internal nozzle 32, i.e., a back pressure P2 of the pressure fluid that is ejected toward the detection surface 30 of the workpiece 28 from the detection nozzle 14.

The position detecting device 10 further includes an amplifier circuit 38, a CPU (Central Processing Unit) 40, an EEPROM (Electronically Erasable Programmable Read-Only Memory) 42 that serves as a storage unit, an input unit 44, an output unit 46, and a connector 48.

The amplifier circuit 38 amplifies an analog signal indicative of the supply pressure P1 sequentially detected by the pressure sensor 34, amplifies an analog signal indicative of the back pressure P2 sequentially detected by the pressure sensor 36, and sequentially outputs the amplified signals to the CPU 40.

The CPU 40 comprises an A/D converter 50, a position detection processor 52, and an error determination processor (abnormality detector) 54.

The A/D converter 50 converts analog signals input sequentially thereto from the amplifier circuit 38 into digital signals.

The EEPROM 42 stores various data that is used by the processes performed by the position detection processor 52, as well as various data that is used by the processes performed by the error determination processor 54.

Figure 12:
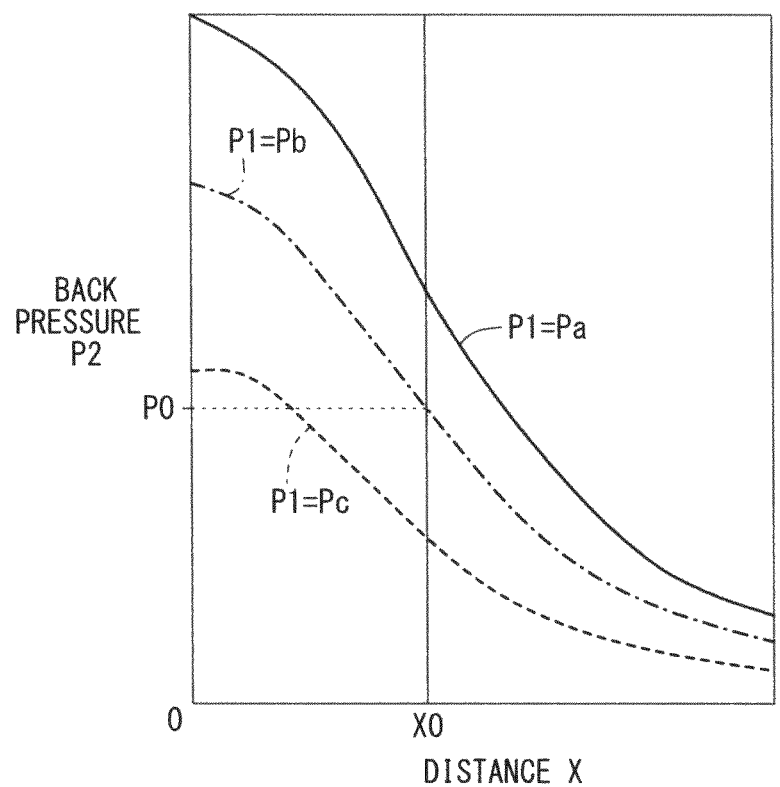
FIG. 12 is a graph showing a relationship between back pressure and distance for each of different supply pressures.

More specifically, in a condition in which the workpiece 28 is arranged beforehand at a set distance X0, and prior to confirming seating of the workpiece 28, the position detecting device 10 detects the back pressure P2 using the pressure sensor 36, at a time that the pressure fluid is supplied at a supply pressure P1 (initial set pressure) to the supply port 18 from the pressure fluid supply source 12, and then sets the detected back pressure P2 to the threshold value P0. Accordingly, in the EEPROM 42, data is stored, which is indicative of the threshold value P0, and of the relationship between the distance X and the back pressure P2 for each of the supplied pressures P1 shown in FIG. 12, as data to be used by the processes performed by the position detection processor 52. The distance X0 is defined as a maximum distance at which it can be regarded that the workpiece 28 is seated with respect to the table 24.

Further, the EEPROM 42 also stores data for the following items (1) through (3), which are used in processes performed by the error determination processor 54.

(1) A value of the supply pressure P1 (supply pressure threshold value P10) for cases in which fluctuations do not occur in the supply pressure P1. (2) A value of the back pressure P2 (back pressure threshold value P20) at a time that the workpiece 28 is seated with respect to the table 24, for cases in which clogging of foreign matter such as cutting oil or cutting chips is not present between the detection port 20 and the detection nozzle 14. (3) A differential pressure (differential pressure threshold (P10−P20)) between the supply pressure P1 and the back pressure P2 at a time that the workpiece 28 is seated with respect to the table 24, for cases in which clogging of foreign matter such as oil or metal particles included in the pressure fluid from the side of the supply port 18, or clogging of foreign matter such as cutting oil or cutting chips from the side of the detection nozzle 14, is not present in the internal nozzle 32.

The respective threshold values (1) through (3) are initial set pressures, which are stored beforehand in the EEPROM 42, representative of the supply pressure P1, the back pressure P2, and the differential pressure (P1−P2) at normal times, for cases in which the aforementioned abnormalities do not occur in the position detecting device 10.

In the event that a later-described error signal is not input thereto from the error determination processor 54, the position detection processor 52 reads out from the EEPROM 42 a threshold value P0, which is responsive to the supply pressure P1 and the back pressure P2 indicated by the A/D converted digital signals. Then, assuming that the read out threshold value P0 and the back pressure P2 satisfy the inequality P2>P0, the position detection processor 52 judges that the workpiece 28 is properly seated with respect to the reference surface 26 of the table 24, and outputs an ON signal, which is indicative of the determination result.

Further, data also is stored in the EEPROM 42 indicating a relationship between the distance X and the back pressure P2 for each of respective supply pressures P1. Thus, in the event that an error signal is not input thereto from the error determination processor 54, the position detection processor 52 may read out, from the EEPROM 42, data corresponding to the supply pressure P1, and using such read out data, may determine a distance X that corresponds to the back pressure P2. Then, assuming that the inequality X<X0 is satisfied, the position detection processor 52 may judge that the workpiece 28 is properly seated with respect to the reference surface 26 of the table 24, and output an ON signal, which is indicative of the determination result.

Using the supply pressure P1, the back pressure P2, and the differential pressure (P1−P2) between the supply pressure P1 and the back pressure P2 indicated by the A/D converted digital signals, the error determination processor 54 determines whether or not there is an abnormality in the position detecting device 10, and in the case it is determined that such an abnormality has occurred, the error determination processor 54 outputs the determination result as an error signal.

The abnormality in the position detecting device 10, as noted above, may be defined by (1) fluctuations (pressure fluctuations) in the supply pressure P1, (2) clogging of foreign matter (drain) between the detection port 20 and the detection nozzle 14, or (3) clogging of foreign matter in the internal nozzle 32. In the case any of such abnormalities are generated, the supply pressure P1, the back pressure P2, and the differential pressure (P1−P2) cannot be detected with sufficient accuracy, which leads to mistaken detection of the distance X in the position detection processor 52.

Thus, the error determination processor 54 reads out the supply pressure threshold value P10 from the EEPROM 42, and based on a comparison between the read-out supply pressure threshold value P10 and the supply pressure P1, if it is determined that a fluctuation in the supply pressure P1 has occurred, the error determination processor 54 outputs the determination result as an error signal. Further, the error determination processor 54 reads out the back pressure threshold value P20 from the EEPROM 42, and based on a comparison between the read-out back pressure threshold value P20 and the back pressure P2, if it is determined that clogging of foreign matter between the detection port 20 and the detection nozzle 14 has occurred, the error determination processor 54 outputs the determination result as an error signal. Furthermore, the error determination processor 54 reads out the differential pressure threshold value (P10−P20) from the EEPROM 42, and based on a comparison between the read-out differential pressure threshold value (P10−P20) and the differential pressure (P1−P2), if it is determined that clogging of foreign matter in the internal nozzle 32 has occurred, the error determination processor 54 outputs the determination result as an error signal. The respective determination processes performed by the error determination processor 54 will be described in detail later.

The input unit 44 is an operation button or the like, which is operated by an operator of a machine tool on which the position detecting device 10 is mounted. The output unit 46 outputs to the exterior an operation result in relation to the input unit 44, a detection result made by the position detection processor 52 in order to confirm seating of the workpiece 28, a determination result indicative of an error signal output from the error determination processor 54, etc. The connector 48 is capable of being connected with a cable that is connected to a non-illustrated external device, e.g., a PLC (Programmable Logic Controller), which serves as a control device for controlling the machine tool.

[Detailed Structure of the Present Embodiment]

Next, the structure of the position detecting device 10 will be explained in greater detail with reference to FIGS. 2 through 5.

Figure 2:
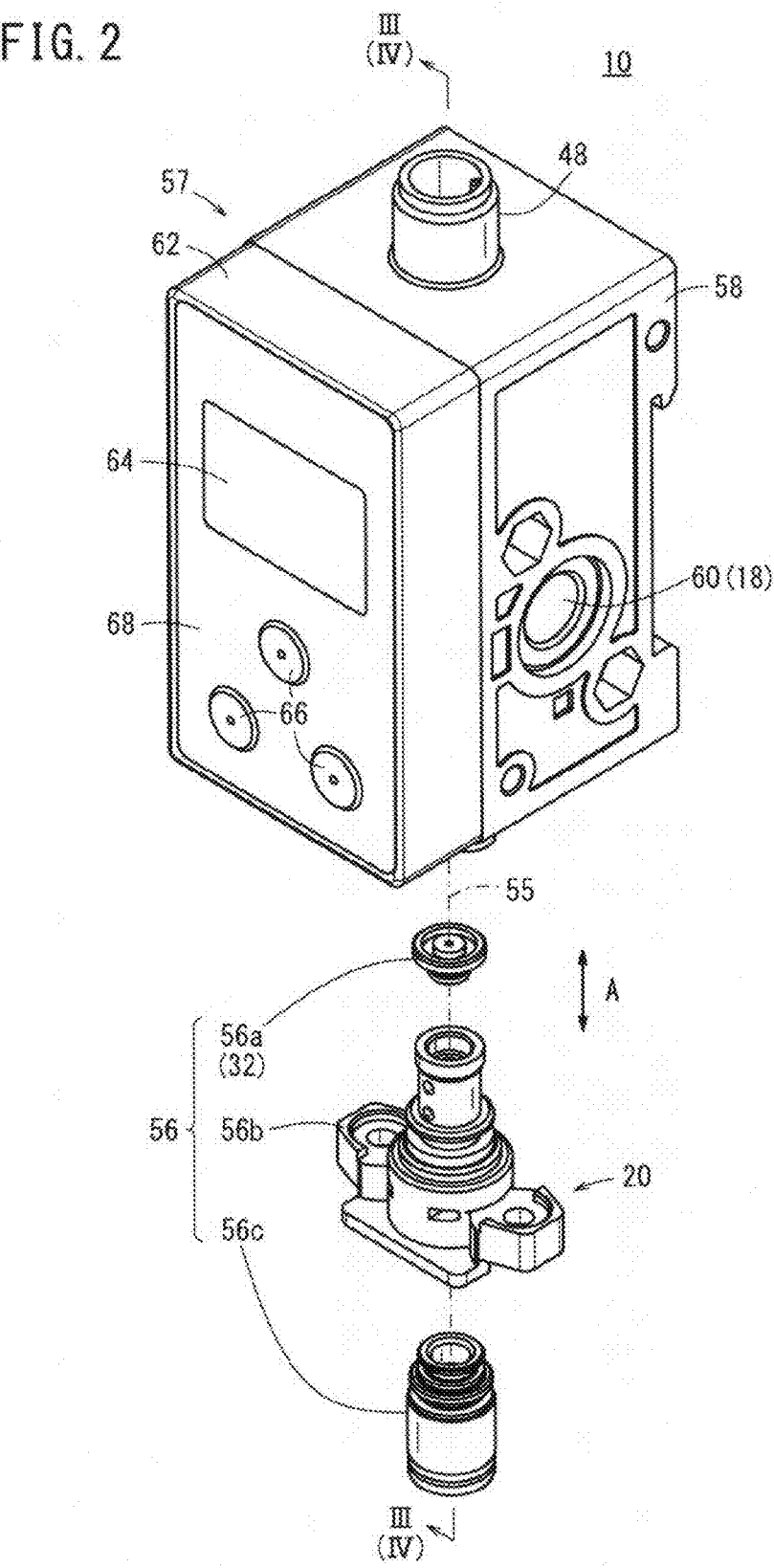
FIG. 2 is a perspective view of the position detecting device of FIG. 1.
Figure 3:
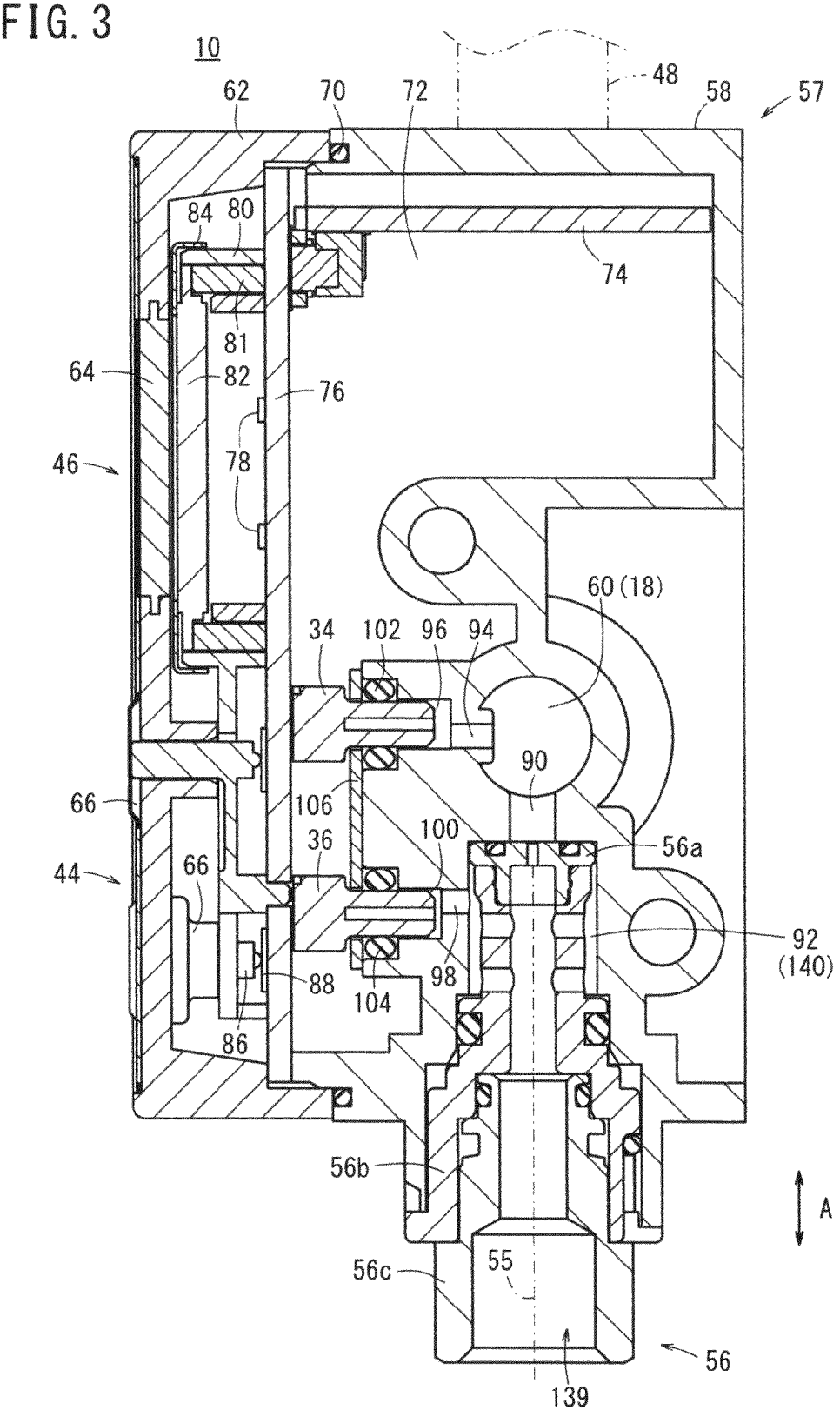
FIG. 3 is a cross sectional view taken along line III-III of FIG. 2.
Figure 4:
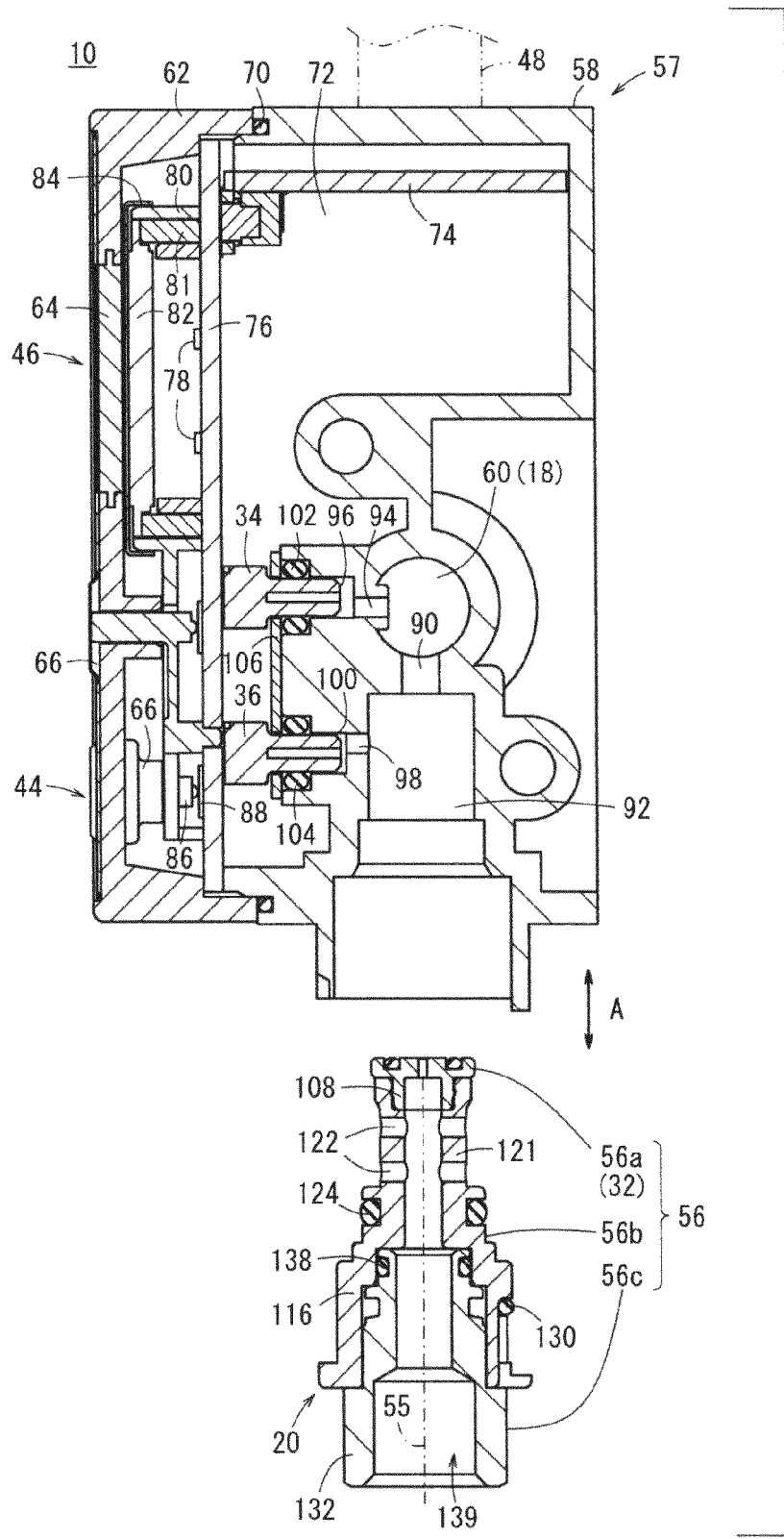
FIG. 4 is a cross sectional view taken along line IV-IV of FIG. 2.
Figure 5:
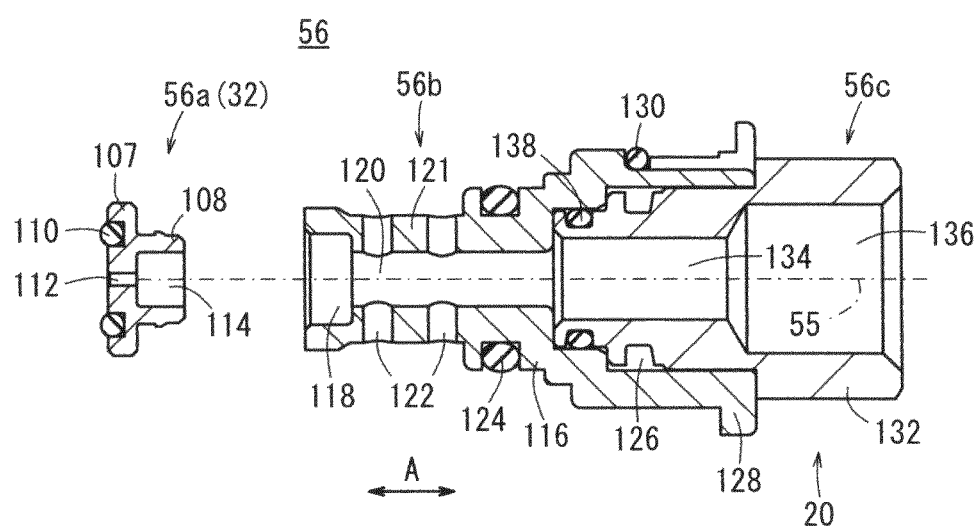
FIG. 5 is a cross sectional view of an attaching/detaching mechanism.

As shown in FIG. 2, the position detecting device 10 comprises a device main body 57 in the form of a substantially hexahedral casing, and an attaching/detaching mechanism 56 that can be attached and detached with respect to the device main body 57. In the case that the position detecting device 10 is mounted on a machine tool, as shown in FIGS. 2 through 4, the position detecting device 10 is attached to the machine tool in a condition such that the attaching/detaching mechanism 56 thereof is oriented downward. Accordingly, in the case that the position detecting device 10 is attached to the machine tool, the operator attaches and detaches the attaching/detaching mechanism 56 with respect to the device main body 57 from a lower side of the device main body 57.

The attaching/detaching mechanism 56 is constituted from a nozzle section 56a that serves as the internal nozzle 32, a first port main body section 56b capable of being connected to the nozzle section 56a, and a second port main body section 56c capable of being connected to the first port main body section 56b. The detection port 20 is made up from the first port main body section 56b and the second port main body section 56c. In this case, the tubular shaped attaching/detaching mechanism 56 is constructed by connecting in series the nozzle section 56a, the first port main body section 56b, and the second port main body section 56c with respect to the device main body 57, along a central axis 55 substantially parallel with the direction of the arrow A (vertical direction).

Accordingly, the attaching/detaching mechanism 56 is capable of being attached to and detached from the device main body 57 in a condition in which the nozzle section 56a, the first port main body section 56b, and the second port main body section 56c are connected integrally and substantially coaxially along the central axis 55. Further, in the case that the attaching/detaching mechanism 56 is detached from the device main body 57, the nozzle section 56a, the first port main body section 56b, and the second port main body section 56c are capable of being separated from one another. Moreover, the nozzle section 56a, the first port main body section 56b, and the second port main body section 56c may also be connected together integrally by insertion-type connection or by swage-type connection, for example.

The device main body 57 includes a base member 58 and a front case 62. The connector 48 is disposed on an upper surface of the base member 58. Further, the supply port 18 is included in the interior of the base member 58, and a supply passage 60 is formed therein to which the pressure fluid is supplied.

In FIG. 2, although a condition is shown in which the supply passage 60 is exposed on a side surface of the base member 58, in the case that the position detecting device 10 is used as a single unit, the position detecting device 10 in which the supply passage 60 is not exposed on the side surface of the base member 58 may be used, or may be used in a state in which the exposed supply passage 60 is blocked by a non-illustrated closing member.

A display window 64 in which various displayed content is shown, and plural operating buttons 66 are arranged on one surface of the front case 62. Other locations apart from the display window 64 and the operating buttons 66 are covered by a sheet member 68.

As shown in FIGS. 3 and 4, the base member 58 and the front case 62 are connected through an intervening packing 70, so that an internal space 72 is formed in the interior of the device main body 57. A circuit board 74, which is connected electrically with the connector 48, is disposed at a location near the connector 48 in the internal space 72. Further, another circuit board 76, which is connected electrically with the circuit board 74, is arranged along the direction of the arrow A at a location close to the side of the front case 62 in the internal space 72.

A back surface side (opposite side of the front case 62) of the base member 58 is recessed significantly toward the front case 62, with the supply passage 60 being formed in such a recessed location. The two pressure sensors 34, 36 are installed in the vicinity of the supply passage 60 on one surface (a surface on the side of the base member 58) of the circuit board 76.

Plural LEDs (Light Emitting Diodes) 78 are mounted in confronting relation to the display window 64 on the other surface of the circuit board 76. Further, a backlight case 80 is assembled on the other surface of the circuit board 76 so as to surround the LEDs 78. An LCD (Liquid Crystal Display) 82 is arranged between the display window 64 and the LEDs 78. The LCD 82 is fixed to ends of the backlight case 80 by a lock plate 84.

The LCD 82 and the circuit board 76 are connected electrically through a rubber connector 81. In this case, the LEDs 78 function as a backlight source with respect to the LCD 82. More specifically, electrical signals are supplied to the LCD 82 from the circuit board 76 via the rubber connector 81 to thereby drive the LCD 82, and with the LCD 82 in a driven state, upon illumination of the LEDs 78, a space defined by the other surface of the circuit board 76, the LCD 82, and the backlight case 80 functions as a light diffusion space in which light from the LEDs 78 is diffused. Accordingly, when the diffused light illuminates the LCD 82, light responsive to the displayed content of the LCD 82 can be irradiated to the exterior through the display window 64. In this manner, the display window 64, the LEDs 78, the rubber connector 81, and the LCD 82 collectively constitute the output unit 46.

Further, a pressing member 86, in the form of a projection, of each of the operating buttons 66 is disposed on a side of the circuit board 76, whereas on the other surface of the circuit board 76, a pressure-sensitive sheet 88 is mounted, which is capable of coming into contact with the pressing member 86. Thus, when the operator presses one of the operating buttons 66, the corresponding pressing member 86 presses the pressure-sensitive sheet 88, and then the pressure-sensitive sheet 88 outputs an electric signal to the circuit board 76 responsive to the pressing force from the pressing member 86. Accordingly, the operating buttons 66, the pressing member 86, and the pressure-sensitive sheet 88 collectively make up the input unit 44.

Furthermore, the circuit boards 74, 76, and non-illustrated electronic components mounted on the circuit boards 74, 76 make up the amplifier circuit 38, the CPU 40, and the EEPROM 42.

The supply passage 60 is connected via a passage 90 to a recess (mounting section) 92 that is formed in a lower portion of the base member 58. The recess 92 is formed with a size that is capable of accepting the nozzle section 56a and the first port main body section 56b of the attaching/detaching mechanism 56, and comprises a tubular shaped recess having a stepped portion. Further, the supply passage 60 is connected to the recess 96 through a passage 94. Further, a passage 98 that communicates with another recess 100 is formed at a location on the passage 90 side of the recess 92.

The pressure sensors 34, 36, for example, as shown in FIGS. 3 and 4, preferably are semiconductor pressure sensors having stepped portions thereon. In this case, distal end parts (sensor parts that detect pressure and convert the same into digital signals) of the pressure sensors 34, 36 are inserted respectively into the recesses 96, 100. Further, o-rings 102, 104 are mounted respectively on outer circumferences of the distal end parts of the respective pressure sensors 34, 36. A retaining plate 106 is interposed between the back surface side of the base member 58 and proximal ends of the pressure sensors 34, 36 that are mounted on the circuit board 76. The o-rings 102, 104 are fixed and retained by the retaining plate 106 on the back surface side of the base member 58.

As shown in FIGS. 2 through 5, the nozzle section 56a of the attaching/detaching mechanism 56 includes a cylindrical member 108 with a flange 107 formed thereon. An o-ring 110 is disposed on the flange 107 on the side of the recess 92. An orifice 112 is formed substantially coaxially with the central axis 55 in a central portion of the flange 107. The orifice 112 communicates with a passage 114 formed in the cylindrical member 108.

The first port main body section 56b includes a tapered cylindrical member 116 on a side thereof close to the nozzle section 56a. On the side thereof close to the nozzle section 56a, the cylindrical member 116 is formed with a recess 118 that is fitted in engagement with the cylindrical member 108. On the cylindrical member 116, a portion thereof forming a passage 120 that communicates with the recess 118 is formed as a reduced diameter section 121, which has an outer diameter smaller than those of other locations on the cylindrical member 116. Communication holes 122 that communicate with the passage 120 are formed at multiple locations in the reduced diameter section 121, along a radial direction (a direction perpendicular to the central axis 55) of the cylindrical member 116.

Further, an o-ring 124 is installed on an outer circumference of a central portion of the cylindrical member 116. A portion on the side of the second port main body section 56c of the cylindrical member 116 is formed as an expanded diameter section 128, the outer diameter of which is greater than those of other locations of the cylindrical member 116. A recess 126, which communicates with the passage 120 and has a size capable of receiving a portion of the second port main body section 56c therein, is formed by the expanded diameter section 128. A clip member 130 is installed on the outer circumference of the expanded diameter section 128.

The second port main body section 56c includes a cylindrical member 132 that tapers toward the side of the first port main body section 56b. The first port main body section 56b side of the cylindrical member 132 is capable of being fitted into the recess 126, and has a passage 134 formed on the inside thereof. Further, the detection nozzle 14 side of the cylindrical member 132 is larger in outer diameter than other locations of the cylindrical member 132, and a passage 136 is formed on the inside thereof that communicates with the passage 134. Furthermore, an o-ring 138 is mounted on the outer circumference of the cylindrical member 132 on a side thereof close to the first port main body section 56b.

Accordingly, as shown in FIG. 4, the attaching/detaching mechanism 56 is constructed when the nozzle section 56a, the first port main body section 56b, and the second port main body section 56c are connected in series, so that each of the passages 114, 120, 134, 136 communicate with the orifice 112, thereby constituting a detection passage 139, which communicates with the detection nozzle 14 via the passage 22. Moreover, the detection passage 139 (made up from the respective passages 114, 120, 134, 136) is formed such that the inner diameters thereof become greater from the nozzle section 56a toward the second port main body section 56c.

When the nozzle section 56a and the first port main body section 56b of the attaching/detaching mechanism 56 are inserted into the recess 92, in a condition in which the nozzle section 56a faces toward the recess 92, the nozzle section 56a and the first port main body section 56b are fitted into the recess 92 as shown in FIG. 3, and the attaching/detaching mechanism 56 becomes attached to the device main body 57. In this case, the clip member 130 presses portions of the base member 58 that forms the recess 92 in the radial direction of the attaching/detaching mechanism 56. Consequently, the nozzle section 56a and the first port main body section 56b can be retained in the recess 92.

Instead of the clip member 130, the attaching/detaching mechanism 56 may be secured in the device main body 57 with screws, or the recess 92 and the outer circumference of the attaching/detaching mechanism 56 may be connected by screw-engagement with each other.

Further, upon installation of the attaching/detaching mechanism 56 in the recess 92, the supply passage 60 is placed in communication via the passage 90 with the orifice 112 and the detection passage 139. In addition, a portion of the recess 92 forms a fluid introduction space 140 together with the reduced diameter section 121, the flange 107, the expanded diameter section 128, and the base member 58. The fluid introduction space 140 communicates with the detection passage 139 through the communication holes 122, and communicates with the recess 100 that faces the distal end portion of the pressure sensor 36 via the passage 98.

[Basic Operations of the Present Embodiment]

The position detecting device 10 according to the present embodiment is constructed as described above. Next, operations of the position detecting device 10 will be explained.

A position detection process for detecting the position of a workpiece 28 will be described, in which pressure fluid is supplied to the position detecting device 10 from the pressure fluid supply source 12, the pressure fluid is ejected toward the workpiece 28 from the detection nozzle 14, the supply pressure P1 is detected by the pressure sensor 34, the back pressure P2 is detected by the pressure sensor 36, and the position of the workpiece 28 is determined based on the detected supply pressure P1 and the detected back pressure P2. More specifically, basic operations of the position detecting device 10 will be explained, for a case in which fluctuations in the supply pressure P1, clogging of foreign matter in (the orifice 112 of the nozzle section 56a functioning as) the internal nozzle 32, and clogging of foreign matter within a location from the detection port 20 to the detection nozzle 14 are not present.

Upon supply of pressure fluid from the pressure fluid supply source 12 to (the supply passage 60 that constitutes) the supply port 18 of the position detecting device 10 via the passage 16, the supply passage 60 in the interior of the device main body 57 supplies the pressure fluid to the internal nozzle 32 via the passage 90. The orifice 112 acts to throttle the pressure fluid and to deliver the pressure fluid to the detection passage 139. The delivered pressure fluid is supplied from the detection passage 139 to the detection nozzle 14 via the passage 22, and the detection nozzle 14 ejects the supplied pressure fluid toward the detection surface 30 of the workpiece 28.

The pressure sensor 34 sequentially detects the pressure (supply pressure) P1 of the pressure fluid introduced to the recess 96 from the supply passage 60 via the passage 94. The pressure sensor 36 sequentially detects the pressure (back pressure) P2 of the pressure fluid introduced thereto from the detection passage 139 via the communication holes 122, the fluid introduction space 140, the passage 98, and the recess 100.

An analog signal of the supply pressure P1 detected sequentially by the pressure sensor 34, and an analog signal of the back pressure P2 detected sequentially by the pressure sensor 36 are amplified by the amplifier circuit 38 and are output sequentially to the CPU 40. The A/D converter 50 of the CPU 40 converts the sequentially input analog signals into digital signals.

The position detection processor 52 reads out a threshold value P0 corresponding to the detected supply pressure P1 and the detected back pressure P2 from the EEPROM 42, and assuming that the inequality P2>P0 is satisfied, the position detection processor 52 outputs an ON signal indicative of seating of the workpiece 28 with respect to the reference surface 26 of the table 24.

Further, data also is stored in the EEPROM 42 representative of a relationship between the back pressure P2 and the distance X for each of respective supply pressures P1. Thus, the position detection processor 52 may read out data corresponding to the detected supply pressure P1 from the EEPROM 42, and using the read-out data, determine a distance X corresponding to the back pressure P2. Then, assuming that the inequality X<X0 is satisfied, an ON signal may be output indicative of seating of the workpiece 28 with respect to the reference surface 26 of the table 24.

As described above, the A/D converter 50 converts analog signals input sequentially from the amplifier circuit 38 into digital signals, and therefore, in the position detection processor 52, a position detecting process preferably is carried out on the aforementioned workpiece 28 each time that digital signals indicative of the detected supply pressure P1 and back pressure P2 are input thereto.

In addition, the CPU 40 supplies the ON signal and signals corresponding to the supply pressure P1 and the back pressure P2 to the LCD 82, and drives the LCD 82 together with driving the LEDs 78. When light from the LEDs 78 illuminates the LCD 82, the LCD 82 irradiates light to the exterior via the display window 64, the light representing display contents corresponding to the supply pressure P1, the back pressure P2, and the ON signal. Accordingly, by visually confirming the aforementioned display contents, the operator can grasp the supply pressure P1, the back pressure P2, and the seating condition of the workpiece 28.

Through such basic operations, the position detecting device 10 is operated on the premise that fluctuations in the supply pressure P1, clogging of foreign matter within a location from the detection port 20 to the detection nozzle 14, and clogging of foreign matter in the orifice 112 are not present. Accordingly, the error determination processor 54 does not output an error signal.

Figure 6:
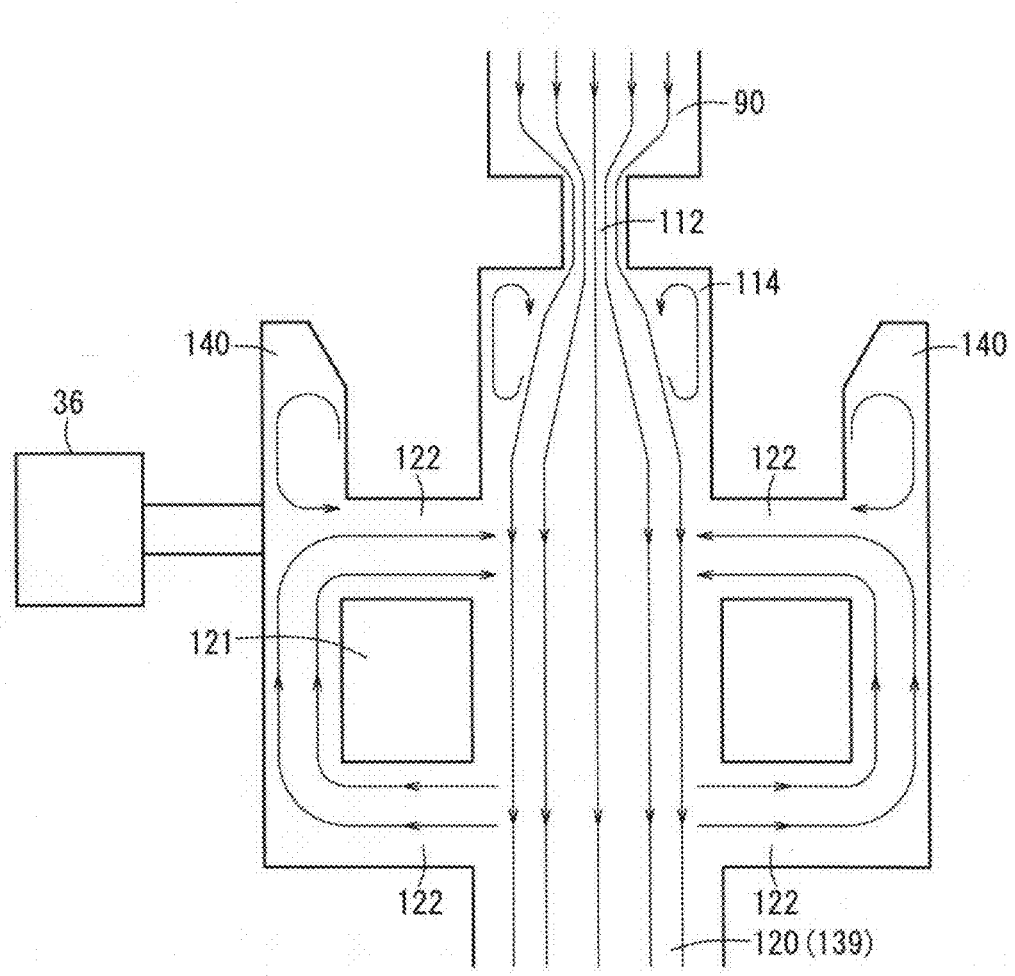
FIG. 6 is an explanatory drawing schematically depicting flows of a pressure fluid in the attaching/detaching mechanism.

FIG. 6 is an explanatory drawing schematically depicting flows of the pressure fluid in the orifice 112 and the detection passage 139, etc. In FIG. 6, the solid lines shown by arrows indicate flow lines and flow directions of the pressure fluid. Further, to facilitate explanation, the passage 98 and the recess 100 are omitted from illustration.

In the foregoing manner, the pressure fluid supplied to the passage 90 from the supply passage 60 (see FIGS. 2 through 4) is constricted (throttled) by the orifice 112, and is directed into the detection passage 139. In this case, in the passage 114, in the vicinity of the orifice 112 in the detection passage 139, the pressure fluid is discharged as a constricted flow from the orifice 112. Owing thereto, in the passage 114, a decrease in pressure of the pressure fluid after flowing through the orifice 112 is comparatively large, and boundary separation occurs.

As a result, stagnation is generated at portions in the passage 114 apart from the constricted flow (i.e., portions on both left and right sides of the passage 114 in FIG. 6). It is easy for foreign matter to collect in such locations where stagnation occurs. Accordingly, at the locations where foreign matter is collected, when detection of the back pressure P2 is carried out by the pressure sensor 36, there is a possibility that the back pressure P2 may be detected erroneously. As the pressure fluid supplied to the detection passage 139 moves further downstream (toward the side of the detection nozzle 14 in FIG. 1), the pressure thereof gradually is restored.

Thus, according to the present invention, so that detection of the back pressure P2 is avoided at locations (in the passage 114) where stagnation occurs and it is easy for foreign matter to collect, the pressure fluid is introduced from the detection passage 139 into the fluid introduction space 140 via the communication holes 122, and the pressure of the introduced pressure fluid is detected by the pressure sensor 36 (via the passage 98 and the recess 100) to thereby detect the back pressure P2. Consequently, the back pressure P2 can be detected accurately and precisely, without being influenced by foreign matter collected in areas where the pressure fluid is stagnant.

Further, with the present embodiment, the communication holes 122 are formed at multiple locations between the fluid introduction space 140 and the detection passage 139. More specifically, as shown in FIGS. 3 to 6, the communication holes 122 are formed at locations on an upstream side near the orifice 112 in the reduced diameter section 121, and at locations on a downstream side further downstream from the aforementioned upstream locations. In this case, the pressure sensor 36 detects the back pressure P2 in the vicinity of the upstream side communication holes 122 in the fluid introduction space 140.

In the foregoing manner, the pressure fluid is introduced into the fluid introduction space 140 via the downstream side communication holes 122, and then discharged into the detection passage 139 via the upstream communication holes 122. For this reason, even if foreign matter infiltrates into the fluid introduction space 140 from the detection passage 139 via the downstream side communication holes 122, the foreign matter is discharged into the detection passage 139 via the upstream side communication holes 122 along with the flow of the pressure fluid. Consequently, clogging of foreign matter in the fluid introduction space 140 can be prevented, and the influence of foreign matter on the back pressure P2 detected by the pressure sensor 36 can be eliminated. Further, since the distal end part of the pressure sensor 36 is arranged so as not to confront the flow of the pressure fluid, direct impingement of foreign matter on the pressure sensor 36 can also be avoided.

[Detection of Abnormalities in the Position Detecting Device]

Next, detection processes for detecting abnormalities in the error determination processor 54 will be described, for a case in which the aforementioned abnormalities occur in the position detecting device 10 according to the present embodiment.

There will now be described (1) a process for detecting fluctuations (pressure variations) of the supply pressure P1, (2) a process for detecting clogging of foreign matter between the detection nozzle 14 and the detection port 20, and (3) a process for detecting clogging of foreign matter in (the orifice 112 of the nozzle section 56a that functions as) the internal nozzle 32.

First, the process for detecting fluctuations of the supply pressure P1 will be explained.

In the foregoing manner, in the event that the pressure fluid is ejected with respect to the workpiece 28 from the detection nozzle 14, and pressure detection of the pressure fluid is carried out respectively by the pressure sensors 34, 36, the error determination processor 54 reads out the supply pressure threshold value P10 from the EEPROM 42, and calculates an absolute value |P1−P10| of the difference between the supply pressure P1, which is converted into a digital signal by the A/D converter 50, and the read-out supply pressure threshold value P10. Next, in the event that the absolute value |P1−P10| is shifted from an arbitrary value (i.e., is greater than the arbitrary value), the error determination processor 54 determines that fluctuation of the supply pressure P1 has occurred, and outputs an error signal to notify the operator of the fluctuation of the supply pressure P1. Moreover, since the respective pressure sensors 34, 36 detect the pressure of the pressure fluid sequentially, the error determination processor 54 carries out the aforementioned detection process each time that a digital signal of the supply pressure P1 is input thereto.

Next, a process for detecting clogging of foreign matter between the detection nozzle 14 and the detection port 20 will be explained.

In the event that the pressure fluid is ejected toward the workpiece 28 from the detection nozzle 14, and detection of the pressure of the pressure fluid is carried out by the respective pressure sensors 34, 36, the error determination processor 54 reads out the back pressure threshold value P20 from the EEPROM 42. Then, the error determination processor 54 compares the read-out back pressure threshold value P20 with the back pressure P2, which is converted into a digital signal by the A/D converter 50, and assuming that the inequality P2>P20 is satisfied, the error determination processor 54 determines that the workpiece 28 has been seated properly with respect to the reference surface 26 of the table 24. On the other hand, if the pressure P2 is less than or equal to the back pressure threshold value P20, that is, if P2≤P20, the error determination processor 54 can determine that the workpiece 28 has not been seated with respect to the reference surface 26 of the table 24.

Figure 7:
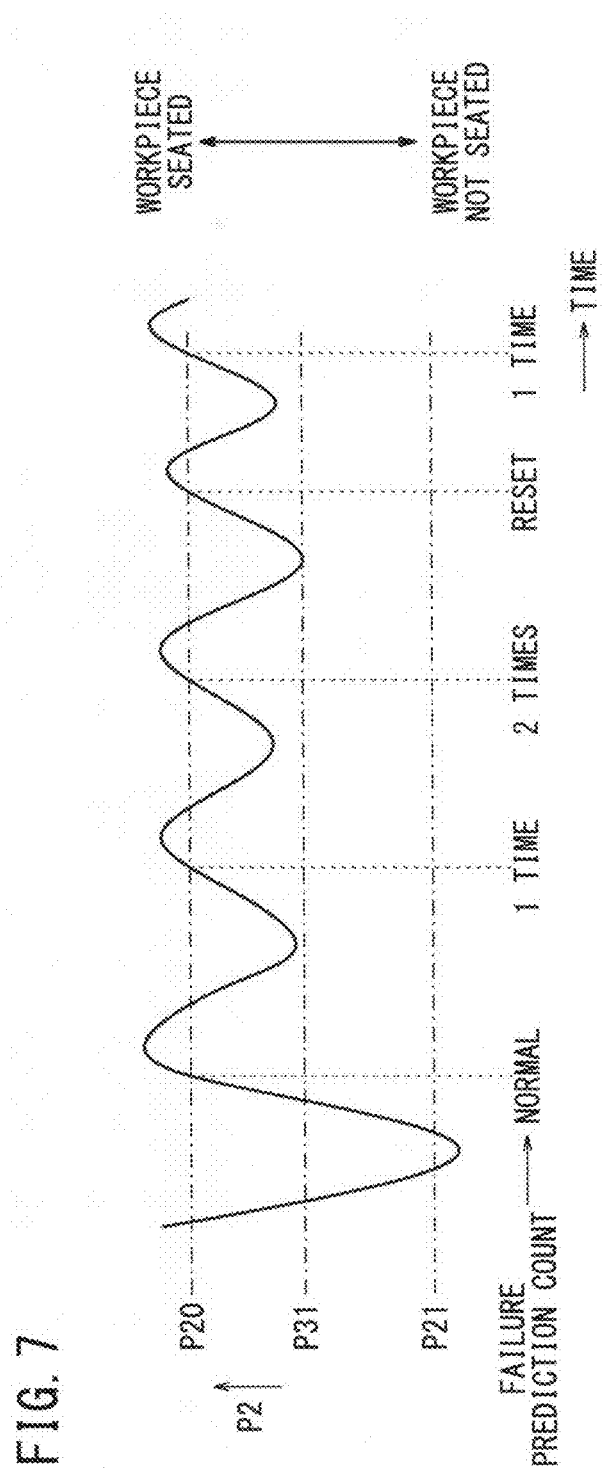
FIG. 7 is a time chart in which operations are described for detecting clogging of foreign matter between a detection port and a detection nozzle.

FIG. 7 is a time chart in which operations are described for detecting clogging of foreign matter using the back pressure threshold value P20, etc.

In the event that the back pressure P2 fluctuates as time elapses, the back pressure P2 rises from a non-seated pressure indicative of a non-seated state of the workpiece 28, and when the back pressure P2 exceeds the back pressure threshold value P20 ("normal" in FIG. 7), it is concluded that the workpiece 28 has been properly seated with respect to the reference surface 26 of the table 24. The error determination processor 54 includes a counting function, such that thereafter, even if the back pressure P2 is reduced once from the back pressure threshold value P20, in the event that the backpressure P2 rises in excess of the back pressure threshold value P20 again without having decreased to a preset clogging prediction pressure P31, counting is performed for a first time as a failure prediction count ("one time" in FIG. 7).

Thereafter, the error determination processor 54 carries out counting each time that the back pressure P2 is lowered from the back pressure threshold value P20, and then rises again in excess of the back pressure threshold value P20 without decreasing to the clogging prediction pressure P31.

In addition, when the number of successive counts reaches a predetermined count, the error determination processor 54 determines that clogging of foreign matter has occurred between the detection nozzle 14 and the detection port 20, and outputs the determination result as an error signal.

More specifically, in the case that the workpiece 28 is in a seated condition with respect to the reference surface 26 of the table 24, since the workpiece 28 blocks the detection nozzle 14, assuming there is no clogging of foreign matter, the back pressure P2 is maintained in excess of the back pressure P20 irrespective of the passage of time. Further, in the event that the workpiece 28 is in a non-seated condition, since the pressure fluid leaks out from the detection nozzle 14, assuming there is no clogging of foreign matter, the back pressure is lowered to a non-seated pressure P21, which is close to atmospheric pressure, irrespective of the passage of time.

However, when clogging of foreign matter exists between the detection port 20 and the detection nozzle 14, since the effective area of the detection port 20, the passage 22, and the detection nozzle 14 becomes smaller, in the case of a non-seated condition of the workpiece 28, it becomes more difficult for pressure fluid to flow from the detection nozzle 14 toward the side of the workpiece 28, and it accordingly becomes difficult for the back pressure P2 to be lowered to the non-seated pressure P21. In such a condition, if the workpiece 28 becomes seated on the reference surface 26 of the table 24 and blocks the detection nozzle 14, the back pressure P2 rises to the back pressure threshold value P20.

For this reason, in the case of the aforementioned clogging, when the workpiece 28 is placed repeatedly in a seated state and a non-seated state, as shown in FIG. 7, over time, the back pressure P2 rises and falls between the back pressure threshold value P20 and the clogging prediction pressure P31. Accordingly, the error determination processor 54 counts the number of times at which the rising and lowering back pressure P2 over time exceeds the back pressure threshold value P20, and if the number of counts reaches a predetermined number, it is determined that clogging of foreign matter has occurred between the detection port 20 and the detection nozzle 14.

In the event that the back pressure P2 decreases below the clogging prediction pressure P31, the error determination processor 54 outputs an error signal, and resets the count for the failure prediction count. Further, since the respective pressure sensors 34, 36 sequentially carry out pressure detection of the pressure fluid, the error determination processor 54 implements the aforementioned detection process each time that digital signals of the back pressure P2 are input thereto.

Furthermore, similar to the back pressure threshold value P20, the non-seated pressure P21 and the clogging prediction pressure P31 may also be stored in the EEPROM 42, and the error determination processor 54 may read out the back pressure threshold value P20, the non-seated pressure P21, and the clogging prediction pressure P31 from the EEPROM 42 each time that the aforementioned process is implemented.

Next, a detection process for detecting clogging of foreign matter in the orifice 112 will be described.

In the case that pressure fluid is ejected from the detection nozzle 14 toward the workpiece 28, and the respective pressure sensors 34, 36 detect the pressure of the pressure fluid, the error determination processor 54 reads out the differential pressure threshold value (P10−P20) from the EEPROM 42. Then, the error determination processor 54 calculates the differential pressure (P1−P2) between the supply pressure P1 and the back pressure P2, which have been converted into digital signals by the A/D converter 50, and compares the calculated differential pressure (P1−P2) with the read-out differential pressure threshold value (P10−P20).

Figure 8:
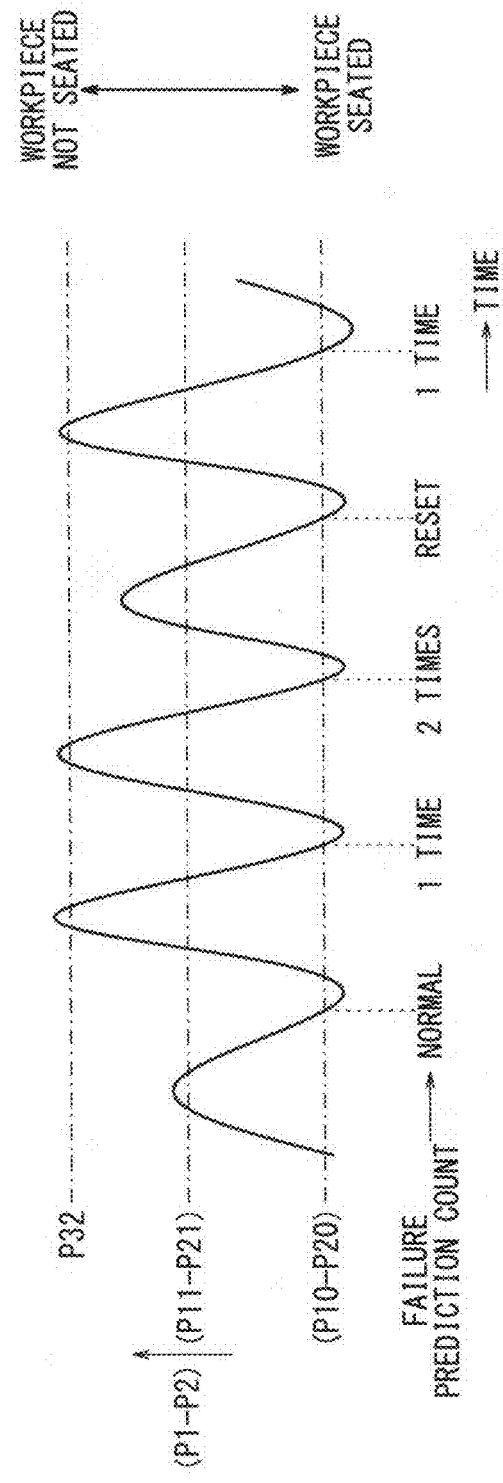
FIG. 8 is a time chart in which operations are described for detecting clogging of foreign matter in an internal nozzle.

FIG. 8 is a time chart in which operations are described for detecting clogging of foreign matter using the differential pressure threshold value (P10−P20), etc.

In the event that the differential pressure (P1−P2) fluctuates accompanying an elapse of time, if the differential pressure (P1−P2) decreases to a value less than the differential pressure threshold value (P10−P20) ("normal" in FIG. 8), it is concluded that the workpiece 28 has been properly seated with respect to the reference surface 26 of the table 24. The error determination processor 54 includes a counting function in relation to this detection process as well. Thus, in the event that the differential pressure (P1−P2) exceeds the differential pressure threshold value (P10−P20) once and then reaches the clogging prediction pressure P32, which was set beforehand, and thereafter the differential pressure (P1−P2) decreases again and becomes lower than the differential pressure threshold value (P10−P20), counting is performed for a first time as a failure prediction count ("one time" in FIG. 8).

Thereafter, the error determination processor 54 carries out counting each time that the differential pressure (P1−P2) rises to reach the clogging prediction pressure P32 and then decreases again to become lower than the differential pressure threshold value (P10−P20).

In addition, when the number of successive counts reaches a predetermined count, the error determination processor 54 determines that clogging of foreign matter has occurred in the internal nozzle 32, and outputs the determination result as an error signal.

More specifically, because the passage 16 and the supply port 18 (supply passage 60) communicate with the detection port 20, the passage 22, and the detection nozzle 14 through the orifice 112, in the event there is no clogging of foreign matter therein, the differential pressure (P1−P2) is maintained at the differential pressure threshold value (P10−P20) irrespective of the passage of time.

When clogging of foreign matter exists in the orifice 112, the effective area of the orifice 112 becomes smaller.

In this case, with the workpiece 28 in a seated condition, the detection nozzle 14 is blocked by the workpiece 28. Therefore, the pressure fluid does not leak out from the detection nozzle 14, and consequently, the differential pressure (P1−P2) becomes a pressure on the order of the differential pressure threshold value (P10−P20).

On the other hand, if the workpiece 28 is in a non-seated condition, since pressure fluid leaks from the detection nozzle 14 toward the side of the workpiece 28, the back pressure P2 decreases, and the differential pressure (P1−P2) increases in value. In such a condition, when the workpiece 28 becomes seated on the reference surface 26 of the table 24 and blocks the detection nozzle 14, the differential pressure (P1−P2) is lowered to the differential pressure threshold value (P10−P20).

Owing thereto, in the case of the aforementioned clogging of the orifice 112, upon repeated seated and unseated states of the workpiece 28, as shown in FIG. 8, the differential pressure (P1−P2) rises and falls over time between the clogging prediction pressure P32 and the differential pressure threshold value (P10−P20). Accordingly, the error determination processor 54 counts the number of times at which the rising and lowering pressure difference (P1−P2) becomes lower than the differential pressure threshold value (P10−P20), and if the number of counts reaches a predetermined number, it is determined that clogging of foreign matter has occurred in the orifice 112.

Moreover, in the error determination processor 54, although the differential pressure (P1−P2) rises to a differential pressure (P11−P21) in a non-seated state of the workpiece 28 in the case that clogging of foreign matter does not exist, when the differential pressure (P1−P2) decreases to the differential pressure threshold value (P10−P20) without having reached the clogging prediction pressure P32, the error determination processor 54 outputs an error signal, and resets the count for the failure prediction count. Further, since the respective pressure sensors 34, 36 sequentially carry out pressure detection of the pressure fluid, the error determination processor 54 implements the aforementioned detection process each time that digital signals of the supply pressure P1 and the back pressure P2 are input thereto. Furthermore, similar to the back pressure threshold value P20, the clogging prediction pressure P32 and the differential pressure (P11−P21) may also be stored in the EEPROM 42, and the error determination processor 54 may read out the differential pressure threshold value (P10−P20), the clogging prediction pressure P32, and the differential pressure (P11−P21) from the EEPROM 42 each time that the aforementioned detection process is implemented.

Moreover, in relation to the detection process for abnormalities carried out in the error determination processor 54, in the case that the various signals are not input from the error determination processor 54, it is a matter of course that the position detection processor 52 carries out a detection process of the seated condition of the workpiece 28, such that an ON signal is output therefrom if the back pressure P2 reaches the back pressure threshold value P20.

[Effects of the Present Embodiment]

As described above, with the position detecting device 10 according to the present embodiment, the attaching/detaching mechanism 56 including the detection port 20 and the internal nozzle 32 is capable of being attached and detached with respect to the device main body 57. Owing thereto, in the case that foreign matter becomes clogged in the internal nozzle 32, the attaching/detaching mechanism 56 can be removed from the device main body 57, and the internal nozzle 32 can be cleaned to eliminate the foreign matter. More specifically, with the present embodiment, the internal nozzle 32 can be removed and clogged foreign matter in the internal nozzle 32 can be eliminated without requiring dismantling of the position detecting device 10 as a whole.

Further, in a condition in which the attaching/detaching mechanism 56 including the detection port 20 is oriented downward, in the case that the position detecting device 10 is to be removed from an upper portion of the machine tool, an operator can remove only the attaching/detaching mechanism 56 from the device main body 57. Consequently, compared with the conventional technique, access to the internal nozzle 32 is easily facilitated, and the internal nozzle 32 can easily be removed from the position detecting device 10.

In particular, in a case in which plural position detecting devices 10 are connected laterally in the form of a manifold, and if the position detecting devices 10 in the form of a manifold are to be removed from an upper portion of a machine tool, it is sufficient to remove the attaching/detaching mechanisms 56 of only those position detecting devices 10 having internal nozzles 32 therein that need to be removed, from the corresponding device main bodies 57. Consequently, ease of maintenance with respect to position detecting devices 10 arranged in the form of a manifold can be improved significantly.

In the foregoing manner, with the present embodiment, by enabling attachment and detachment of the attaching/detaching mechanism 56 with respect to the device main body 57, ease of maintenance of the position detecting device 10 can be enhanced. Further, by enhancing maintenance thereon, the operation to remove clogged foreign matter in the internal nozzle 32 can easily be performed. Thus, mistaken detection of the position of the workpiece 28 can be prevented.

In the case that plural position detecting devices 10 are connected laterally in the form of a manifold, instead of the connector 48, connectors preferably are disposed on opposite side surfaces of each of the position detecting devices 10. Consequently, when the respective position detecting devices 10 are connected laterally, the supply passages 60 of the respective position detecting devices 10 are connected, and each of the connectors can be connected electrically. As a result, supply of pressure fluid to each of the supply passages 60 from the pressure fluid supply source 12, and supply of power, etc., from a non-illustrated controller to the respective position detecting devices 10 via the connectors can be carried out.

Further, the supply passage 60 and the recess 92 are provided in the device main body 57, so that when the attaching/detaching mechanism 56 is mounted in the recess 92, the supply passage 60 communicates with the orifice 112 and the detection passage 139 on the side of the attaching/detaching mechanism 56. If mounted in this manner, the attaching/detaching mechanism 56 can easily be attached and detached with respect to the device main body 57, and ease of maintenance can be enhanced. Further, since the supply passage 60, the orifice 112, and the detection passage 139 are placed in communication simply by mounting the attaching/detaching mechanism 56 in the recess 92, assembly of the attaching/detaching mechanism 56 is made easier.

In addition, by retaining the attaching/detaching mechanism 56 on the device main body 57 (in the recess 92 thereof) by means of the clip member 130 or the like, the attaching/detaching mechanism 56 can be attached and detached with respect to the recess 92 without requiring use of a specialized tool. Further, if the passage 22, which is connected to (the second port main body section 56c that makes up) the detection port 20, is formed by tubing, an operator can detach only the attaching/detaching mechanism 56 from the device main body 57 by pulling the tubing, and without requiring dismantling of the position detecting device 10 as a whole.

Further, by introduction of pressure fluid from the detection passage 139 into the fluid introduction space 140 via the communication holes 122, and detecting the back pressure P2 of the introduced pressure fluid by way of the pressure sensor 36, the back pressure P2 can reliably be detected with good precision, without being influenced by foreign matter collected in areas where the fluid is stagnant inside the detection passage 139.

Furthermore, by forming the plural individual communication holes 122 in the reduced diameter section 121, flows of the pressure fluid are generated between the detection passage 139 and the fluid introduction space 140. Owing thereto, even if foreign matter becomes mixed with the fluid in the fluid introduction space 140 from the detection passage 139 via one of the communication holes 122, such foreign matter can be discharged to the detection passage 139 via the other communication holes 122. As a result, collection of foreign matter in the fluid introduction space 140 can be prevented, and any influence of such foreign matter on the back pressure P2 detected by the pressure sensor 36 can reliably be eliminated.

The communication holes 122 preferably are disposed at an upstream side location close to the orifice 112 in the reduced diameter section 121, and at a location further downstream from the aforementioned upstream side location. If disposed in this way, the pressure fluid is introduced into the fluid introduction space 140 via the downstream side communication holes 122, and is discharged into the detection passage 139 via the upstream side communication holes 122. In this case, if the back pressure P2 is detected by the pressure sensor 36 in the vicinity of the upstream side communication holes 122 in the fluid introduction space 140, flows of the pressure fluid do not confront the pressure sensor 36, and therefore, direct impingement of foreign matter on the pressure sensor 36 can be avoided.

By detecting the supply pressure P1 of the pressure fluid that is introduced into the supply passage 60 by way of the pressure sensor 34, monitoring of the supply pressure P1 (e.g., monitoring of fluctuations in the supply pressure P1) is made possible.

Further, since the pressure sensors 34, 36 are gauge pressure sensors, without using a differential pressure sensor, which is comparatively high in cost, the differential pressure (P1−P2) between an upstream side (the supply passage 60) and a downstream side (the detection passage 139) of the internal nozzle 32 can be calculated.

The error determination processor 54 detects an abnormality of the position detecting device 10 based on pressures detected by the pressure sensors 34, 36, and outputs a detection result as an error signal. Owing thereto, abnormalities of the position detecting device 10 can be indicated as errors to the exterior (e.g., an operator).

The aforementioned abnormalities of the position detecting device 10 may be any one of (1) fluctuations in the supply pressure P1, (2) clogging of foreign matter between the detection port 20 and the detection nozzle 14, and (3) clogging of foreign matter in (the orifice 112 of) the internal nozzle 32. Thus, the error determination processor 54 detects fluctuations in the supply pressure P1 based on the supply pressure P1 detected by the pressure sensor 34, detects clogging of foreign matter between the detection port 20 and the detection nozzle 14 based on the back pressure P2 detected by the pressure sensor 36, and detects clogging of foreign matter in the orifice 112 based on the differential pressure (P1−P2) between the supply pressure P1 and the back pressure P2 detected respectively by the pressure sensors 34, 36.

In the foregoing manner, with the present embodiment, occurrences of the aforementioned abnormalities (1) through (3) are monitored, and if such an abnormality occurs, since the abnormality is indicated to the exterior, the cause of the abnormality can be specified, while avoiding various types of mistaken detections by the position detecting device 10 before they occur.

The error determination processor 54 detects abnormalities in the position detecting device 10, based on a comparison between data of various threshold values stored in the EEPROM 42 and the supply pressure P1 and/or the back pressure P2, or alternatively, the differential pressure (P1−P2) as detected by the pressure sensors 34, 36. Accordingly, such abnormalities in the position detecting device 10 can be detected reliably and accurately.

Furthermore, in a condition in which the attaching/detaching mechanism 56 is removed from the device main body 57, since the nozzle section 56a, the first port main body section 56b, and the second port main body section 56c are separable from each other, the operation to eliminate foreign matter that clogs (the orifice 112 of the nozzle section 56a that serves as) the internal nozzle 32 can easily be performed, together with enabling the internal nozzle 32 to easily be exchanged.

[Modifications of the Present Embodiment]

The present embodiment is not limited to the descriptions made above, and can be modified in the following ways.

Figure 9:
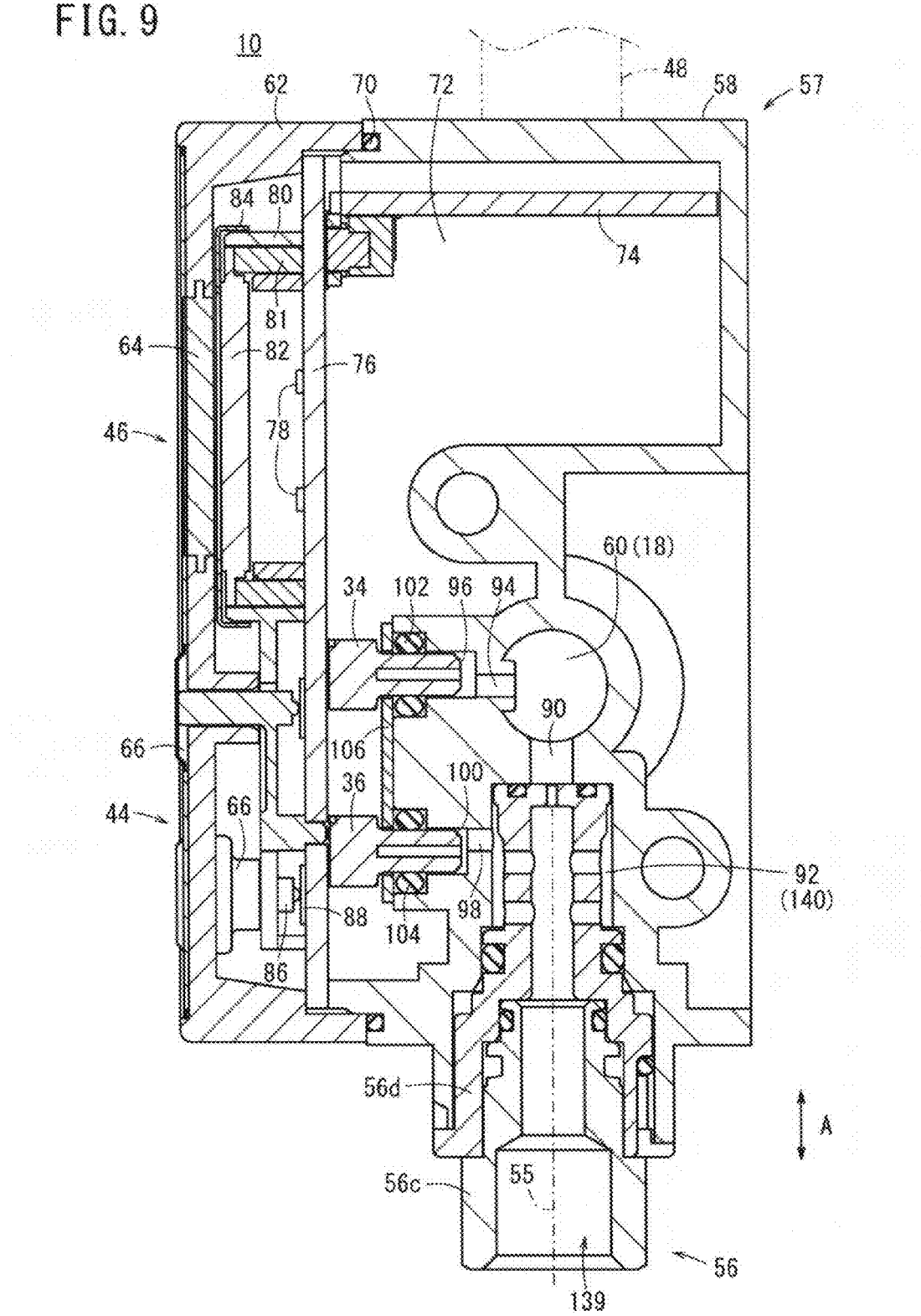
FIG. 9 is a cross sectional view of the position detecting device according to a modification of the present embodiment.
Figure 10:
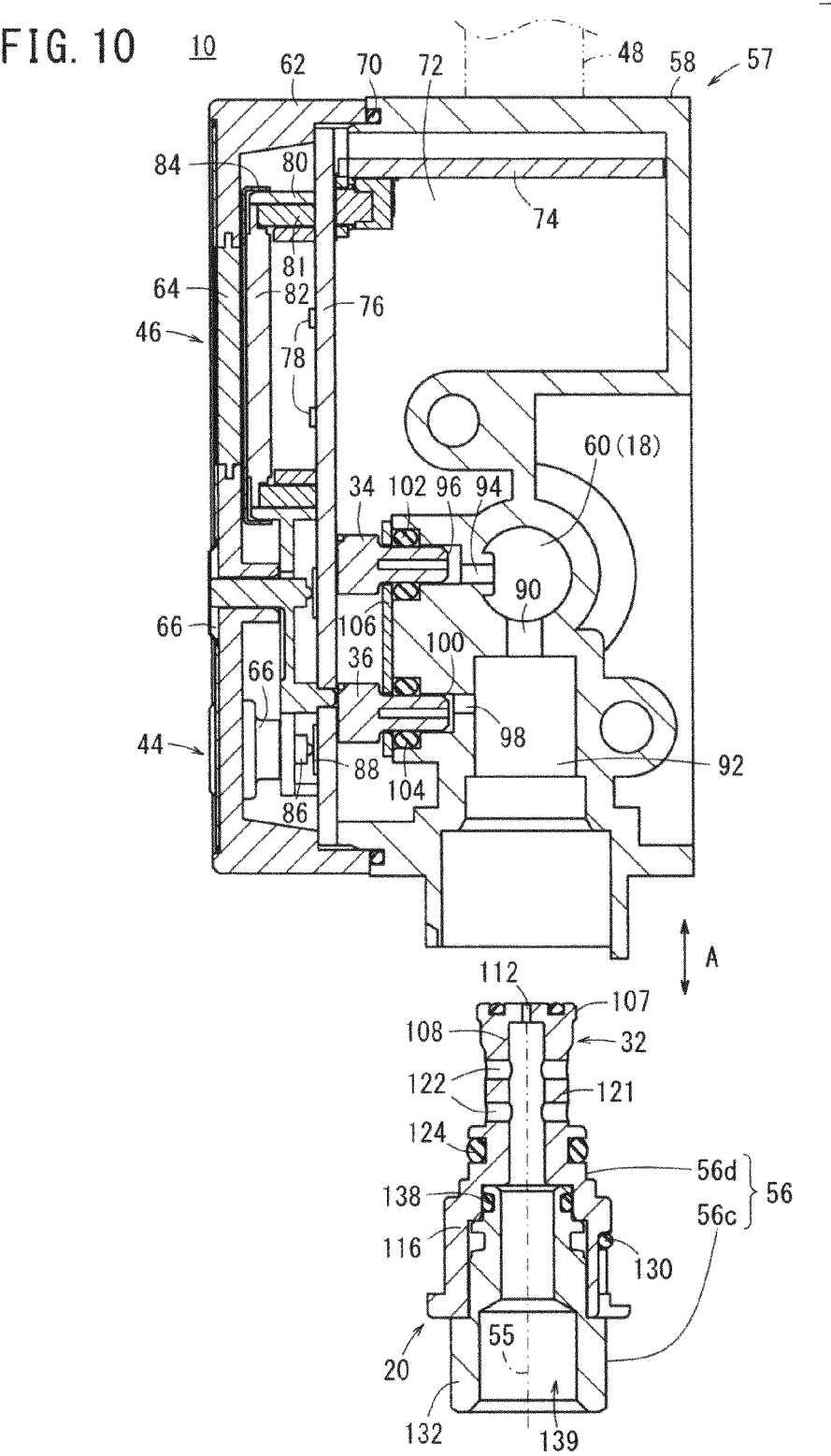
FIG. 10 is a cross sectional view showing a condition in which the attaching/detaching mechanism is removed from a device main body of the position detecting device of FIG. 9.
Figure 11:
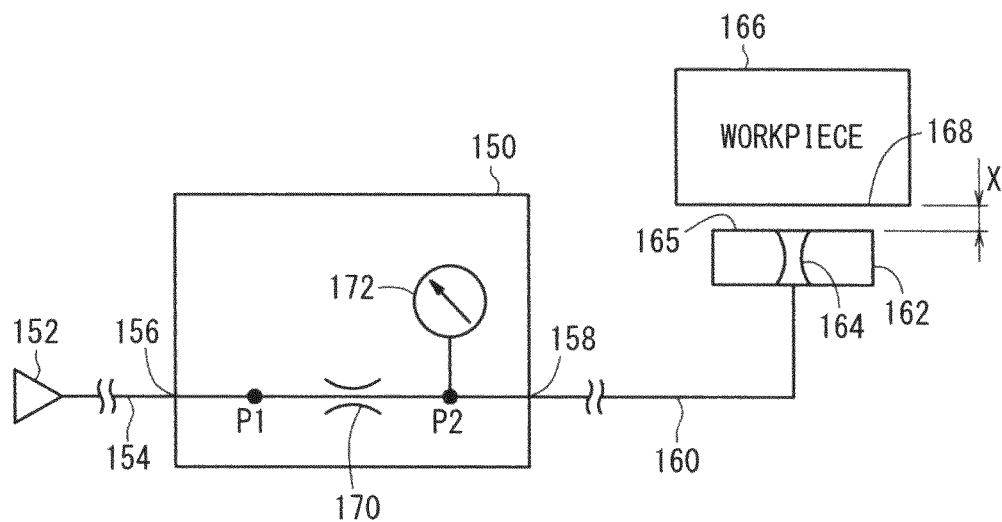
FIG. 11 is an outline explanatory drawing of a position detecting device according to a conventional technique.

(1) As shown in FIGS. 9 and 10, the attaching/detaching mechanism 56 may be constituted as a monocoque structure in which at least a portion of the detection port 20 and a location of the internal nozzle 32 are formed integrally with each other. More specifically, in the case of FIGS. 9 and 10, the attaching/detaching mechanism 56 has the second port main body section 56c, and a monocoque section 56d with a structure that includes the internal nozzle 32 and a portion (the first port main body section 56b in FIGS. 2 to 5) of the detection port 20.

If such a monocoque structure is provided, the mechanical strength of a portion of the attaching/detaching mechanism 56 that is mounted in the recess 92 can be enhanced. Moreover, the monocoque section 56d and the second port main body section 56c may be connected together by insertion-type connection or by swage-type connection.

(2) With the present embodiment, as shown in FIGS. 1, 3, and 4, a case has been described in which the pressure sensors 34, 36 are both gauge pressure sensors. Alternatively, a structure may be provided in which a differential pressure sensor, which detects a differential pressure (P1−P2) between the supply pressure P1 and the back pressure P2, is arranged together with either one of the pressure sensors 34, 36 being a gauge pressure sensor.

In this case as well, using the differential pressure (P1−P2) and the one gauge pressure, since the other gauge pressure can be calculated therefrom, the various processes of the position detection processor 52 and the error determination processor 54 can be implemented.

(3) The PLC, which serves as a controller for the machine tool, is also a controller that controls conveyance of the workpiece 28, and includes information that pertains to conveyance of the workpiece 28. Thus, the position detecting device 10 may receive information that pertains to conveyance of the workpiece 28, from the PLC via the connector 48 and a non-illustrated cable.

As a result thereof, with the position detecting device 10, since it can be grasped whether or not the workpiece 28 has been conveyed in a manner to confront the reference surface 26 of the table 24, the error determination processor 54 can detect an abnormality of the position detecting device 10 more accurately while also referring to such information.

For example, in the case that information is input to the effect that the workpiece 28 was conveyed, if upon conveyance of the workpiece 28, and even after elapse of a predetermined time, the back pressure P2 is not lowered to the clogging prediction pressure P31, the error determination processor 54 may determine that clogging of foreign matter has occurred between the detection port 20 and the detection nozzle 14, and output such a determination result as an error signal.

Further, in the case that information is input to the effect that the workpiece 28 was conveyed, upon conveyance of the workpiece 28, when the number of times that the differential pressure (P1−P2) rises to the clogging prediction pressure P32 exceeds a predetermined number of times, the error determination processor 54 may determine that clogging of foreign matter has occurred in the internal nozzle 32, and output such a determination result as an error signal.

Moreover, if the workpiece 28 is not transported to the table 24, confirmation of seating of the workpiece 28 with respect to the table 24 cannot be carried out. Accordingly, in the event that information is input to the effect that transportation of the workpiece 28 is not being carried out, the error determination processor 54 stops execution of the determination process.

(4) In the above description, a case has been described in which the pressure sensors 34, 36 are installed in the position detecting device 10. With the present embodiment, it is sufficient if a structure is provided in which at least the attaching/detaching mechanism 56 is attachable and detachable with respect to the device main body 57. Therefore, even with a position detecting device 10 in which the pressure sensors 34, 36 are not installed therein, various other advantageous effects can be obtained in relation to attachment and detachment of the attaching/detaching mechanism 56 with respect to the device main body 57.

The position detecting device according to the present invention is not limited to the above embodiment. Various changes and modifications may be made to the embodiment without departing from the scope of the invention as set forth in the appended claims.

What is claimed is:

1. A position detecting device for detecting a position of a workpiece by ejecting a pressure fluid supplied from a pressure fluid supply source from a detection nozzle with respect to a detection surface of the workpiece, and detecting a back pressure of the pressure fluid, comprising:
    a device main body into which the pressure fluid supplied from the pressure fluid supply source is introduced; and
    an attaching/detaching mechanism that enables attachment and detachment with respect to the device main body, including an internal nozzle that delivers, toward a side of the detection nozzle, the pressure fluid supplied to the device main body, and a detection port that supplies, to the detection nozzle, the pressure fluid delivered from the internal nozzle;
    a communication hole that communicates with a detection passage is disposed in a reduced diameter section along a radial direction of the attaching/detaching mechanism; and
    a fluid introduction space which communicates with the detection passage via the communication hole at a location in a vicinity of the reduced diameter section in a mounting section, when the attaching/detaching mechanism is mounted,
    wherein the position detecting device further comprises a detection passage side pressure sensor for detecting the back pressure, by detecting a pressure of the pressure fluid introduced from the detection passage into the fluid introduction space via the communication hole.

2. The position detecting device according to claim 1, wherein:
    the attaching/detaching mechanism is tubular-shaped, one end thereof extending along a central axis of the attaching/detaching mechanism constituting the internal nozzle, and another end thereof extending along the central axis constituting the detection port;
    the mounting section is a recess in which the tubular-shaped attaching/detaching mechanism is capable of being mounted; and
    a portion of the detection port on the side of the internal nozzle includes the reduced diameter section having an outer diameter smaller than an inner diameter of the recess.

3. The position detecting device according to claim 2, wherein the communication hole includes a plurality of individual communication holes in the reduced diameter section.

4. The position detecting device according to claim 2, further comprising a supply passage side pressure sensor for detecting a supply pressure of the pressure fluid supplied to a supply passage from the pressure fluid supply source.

5. The position detecting device according to claim 4, wherein:
    the detection passage side pressure sensor comprises a gauge pressure sensor disposed in the device main body so as to face the fluid introduction space; and
    the supply passage side pressure sensor comprises a gauge pressure sensor disposed in the device main body so as to face the supply passage.

6. The position detecting device according to claim 4, further comprising:
    a differential pressure sensor including functions of the supply passage side pressure sensor and the detection passage side pressure sensor, for detecting a differential pressure between the supply pressure and the back pressure; and
    a gauge pressure sensor that functions either as the supply passage side pressure sensor, which is disposed in the device main body so as to face the supply passage, or as the detection passage side pressure sensor, which is disposed in the device main body so as to face the fluid introduction space.

7. The position detecting device according to claim 4, further comprising an abnormality detector for detecting an abnormality of the position detecting device, based on the supply pressure detected by the supply passage side pressure sensor and/or the back pressure detected by the detection passage side pressure sensor.

8. The position detecting device according to claim 7, wherein the abnormality detector detects a variation in the supply pressure based on the supply pressure detected by the supply passage side pressure sensor.

9. The position detecting device according to claim 7, wherein the abnormality detector detects clogging of foreign matter between the detection port and the detection nozzle, based on the back pressure detected by the detection passage side pressure sensor.

10. The position detecting device according to claim 7, wherein the abnormality detector detects clogging of foreign matter in the internal nozzle, based on a differential pressure between the supply pressure detected by the supply passage side pressure sensor and the back pressure detected by the detection passage side pressure sensor.

11. The position detecting device according to claim 7, further comprising a storage unit for storing a predetermined threshold value, wherein the abnormality detector detects an abnormality of the position detecting device, based on a comparison between the threshold value read out from the storage unit, and the supply pressure detected by the supply passage side pressure sensor and/or the back pressure detected by the detection passage side pressure sensor.

12. The position detecting device according to claim 7, wherein the abnormality detector detects an abnormality of the position detecting device, based on information pertaining to conveyance of the workpiece supplied from a control device that controls conveyance of the workpiece, and the supply pressure detected by the supply passage side pressure sensor and/or the back pressure detected by the detection passage side pressure sensor.

13. The position detecting device according to claim 1, wherein the internal nozzle and the detection port are constructed integrally as a monocoque structure, or are capable of being separated when the attaching/detaching mechanism is removed from the device main body.

14. The position detecting device according to claim 1, wherein:
the device main body includes a supply passage into which the pressure fluid supplied from the pressure fluid supply source is introduced, and the mounting section, which communicates with the supply passage and on which the attaching/detaching mechanism is mounted,
the internal nozzle includes an orifice which communicates with the supply passage when the attaching/detaching mechanism is mounted on the mounting section, and
the detection port includes the detection passage which communicates with the orifice, and which supplies, to the detection nozzle, the pressure fluid delivered from the supply passage via the orifice.

* * * * *